United States Patent
Koji et al.

(10) Patent No.: US 10,409,180 B2
(45) Date of Patent: Sep. 10, 2019

(54) RESIN FINE PARTICLES, METHOD OF PRODUCING RESIN FINE PARTICLES, METHOD OF PRODUCING RESIN PARTICLES, AND METHOD OF PRODUCING TONER

(71) Applicant: CANON KABUSHIKI KAISHA, Tokyo (JP)

(72) Inventors: Shinnosuke Koji, Yokohama (JP); Sakae Suda, Yokohama (JP); Yusuke Kosaki, Susono (JP); Shohei Fukuya, Tokyo (JP); Tetsuya Kinumatsu, Mishima (JP); Kenji Aoki, Numazu (JP); Toshifumi Mori, Tokyo (JP); Shuntaro Watanabe, Hadano (JP); Noritaka Toyoizumi, Mishima (JP); Atsushi Tani, Tokyo (JP); Kazumichi Nakahama, Sunto-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/889,585

(22) Filed: Feb. 6, 2018

(65) Prior Publication Data
US 2018/0231901 A1    Aug. 16, 2018

(30) Foreign Application Priority Data

Feb. 13, 2017 (JP) .................................. 2017-024431
Dec. 25, 2017 (JP) .................................. 2017-247821

(51) Int. Cl.
*G03G 9/08*    (2006.01)
*G03G 9/087*   (2006.01)
(Continued)

(52) U.S. Cl.
CPC ......... *G03G 9/0804* (2013.01); *C08F 212/08* (2013.01); *C08G 63/195* (2013.01);
(Continued)

(58) Field of Classification Search
CPC ........................... G03G 9/0804; C08F 212/08
(Continued)

(56) References Cited

U.S. PATENT DOCUMENTS 7,014,969 B2   3/2006   Yachi et al.
7,452,649 B2   11/2008  Magome et al.
(Continued)

FOREIGN PATENT DOCUMENTS

JP   2010-132851 A   6/2010
JP   2013-137535 A   7/2013

OTHER PUBLICATIONS

U.S. Appl. No. 15/814,818, filed Nov. 16, 2017, Masao Suzuki.
U.S. Appl. No. 15/901,220, filed Feb. 21, 2018, Koji Nishikawa.
U.S. Appl. No. 15/903,241, filed Feb. 23, 2018, Keisuke Tanaka.

*Primary Examiner* — Mark A Chapman
(74) *Attorney, Agent, or Firm* — Venable LLP

(57) ABSTRACT

A method of producing a toner including the steps of: mixing resin fine particles, an organic solvent, and a resin R with a dispersion medium containing carbon dioxide, to prepare a dispersion of resin R-containing droplets; and removing the organic solvent by flowing carbon dioxide, wherein the resin fine particles contain one or more resins that have a partial structure A, B, and C, and are soluble in chloroform; the SP value of the partial structure A, the resin R, and the partial structure B satisfy particular relationships; a resin A constituted of the partial structure A and a resin B constituted of the partial structure B are soluble in the organic solvent; and a resin C constituted of the partial structure C is insoluble in the organic solvent.

17 Claims, 5 Drawing Sheets

(51) Int. Cl.
  *C08F 212/08* (2006.01)
  *C08G 63/195* (2006.01)
  *C08G 63/20* (2006.01)
  *C08G 81/02* (2006.01)
(52) U.S. Cl.
  CPC .......... *C08G 63/20* (2013.01); *C08G 81/027* (2013.01); *G03G 9/0819* (2013.01); *G03G 9/0825* (2013.01); *G03G 9/08711* (2013.01); *G03G 9/08755* (2013.01); *G03G 9/08786* (2013.01); *G03G 9/08788* (2013.01); *G03G 9/08795* (2013.01); *G03G 9/08797* (2013.01)
(58) Field of Classification Search
  USPC ...................................................... 430/137.1
  See application file for complete search history.

(56) References Cited

U.S. PATENT DOCUMENTS

| | | | |
|---|---|---|---|
| 7,935,771 B2 | 5/2011 | Fukui et al. |
| 8,093,342 B2 | 1/2012 | Minami et al. |
| 8,110,329 B2 | 2/2012 | Tominaga et al. |
| 8,178,275 B2 | 5/2012 | Tani et al. |
| 8,372,573 B2 | 2/2013 | Ayaki et al. |
| 8,383,312 B2 | 2/2013 | Fujimoto et al. |
| 8,465,896 B2 | 6/2013 | Sekikawa et al. |
| 8,475,987 B2 | 7/2013 | Kaya et al. |
| 8,497,056 B2 | 7/2013 | Sekikawa et al. |
| 8,551,680 B2 | 10/2013 | Ayaki et al. |
| 8,603,712 B2 | 12/2013 | Aoki et al. |
| 8,652,725 B2 | 2/2014 | Watanabe et al. |
| 8,741,519 B2 | 6/2014 | Watanabe et al. |
| 8,846,284 B2 | 9/2014 | Kinumatsu et al. |
| 8,975,000 B2 | 3/2015 | Tani et al. |
| 9,056,955 B2 | 6/2015 | Mizumori et al. |
| 9,176,410 B2 | 11/2015 | Tani et al. |
| 9,309,349 B2 | 4/2016 | Watanabe et al. |
| 9,429,860 B2 | 8/2016 | Kinumatsu et al. |
| 9,625,844 B2 | 4/2017 | Kaya et al. |
| 9,658,554 B2 | 5/2017 | Kinumatsu et al. |
| 9,798,256 B2 | 10/2017 | Kosaki et al. |
| 9,798,262 B2 | 10/2017 | Toyoizumi et al. |
| 9,811,016 B2 | 11/2017 | Aoki et al. |
| 9,823,595 B2 | 11/2017 | Toyoizumi et al. |
| 9,857,713 B2 | 1/2018 | Kosaki et al. |
| 9,869,943 B2 | 1/2018 | Aoki et al. |
| 2005/0209364 A1 | 9/2005 | Yamagishi et al. |
| 2010/0035171 A1 | 2/2010 | Watanabe et al. |
| 2011/0020741 A1 | 1/2011 | Mizumori et al. |
| 2013/0202998 A1 | 8/2013 | Higashi et al. |
| 2014/0356777 A1 | 12/2014 | Tani et al. |
| 2016/0187798 A1 | 6/2016 | Toyoizumi et al. |
| 2016/0291494 A1 | 10/2016 | Kinumatsu et al. |
| 2017/0003610 A1 | 1/2017 | Kosaki et al. |

RESIN FINE PARTICLES, METHOD OF PRODUCING RESIN FINE PARTICLES, METHOD OF PRODUCING RESIN PARTICLES, AND METHOD OF PRODUCING TONER

BACKGROUND OF THE INVENTION

Field of the Invention

The present invention relates to a resin fine particles, a method of producing resin fine particles, and a method of producing resin particles and a toner using these resin fine particles.

Description of the Related Art

Resin particles are used in diverse fields, e.g., coatings, inks, toners, and so forth. Control of the particle diameter and particle diameter distribution of the resin particles is regarded as crucial in all of these fields, and there is desire in particular for resin particles in which smaller particle diameters coexist with sharpness in the particle size distribution.

Among these fields, in the field of toners in particular, increasingly higher levels of image quality are regarded as crucial and the presence of uniform properties between and among toner particles is required. Generating a uniform and small toner particle diameter and providing a sharp particle size distribution are effective for achieving these demands. The "dissolution suspension" method is known to be a production method that supports a relatively facile sharpening of the particle size distribution of resin particles. Moreover, methods that use carbon dioxide as a dispersion medium have been proposed in recent years. A dispersing agent may be effectively used in resin particle production by the dissolution suspension method to provide a sharp particle size distribution. In general, a dispersing agent (surfactant, polymeric dispersion agent) that is used in the dissolved state in the dispersion medium brings about the stable dispersion, regardless of droplet size, of from microfine droplets to coarse droplets. In contrast to this, finely particulate dispersing agents, because they do not stabilize microfine droplets, are said to be advantageous for the goal of sharpening the particle size distribution of toner particles. While inorganic fine particles and resin fine particles can be used as finely particulate dispersing agents, the maintenance of a finely particulate state is crucial to the function of resin fine particles as a dispersing agent, and as a consequence a resistance to organic solvents is required of the resin fine particles.

Moreover, in order to maintain a droplet in a dispersed state, the dispersing agent must segregate to the interface between the droplet and the dispersion medium, and it is therefore crucial that the dispersing agent have affinity for both the resin solution and the dispersion medium. In the case of use of carbon dioxide, which is hydrophobic, as the dispersion medium, organopolysiloxane structures are known to function as segments that exhibit affinity for hydrophobic media.

Japanese Patent Application Laid-open No. 2010-132851 proposes a resin particle production method that uses liquid or supercritical carbon dioxide as the dispersion medium and that uses resin fine particles for the dispersing agent. Crystalline resin fine particles, e.g., of polyester, a behenyl acrylate copolymer, and so forth, are used in this method.

Japanese Patent Application Laid-open No. 2013-137535 proposes a method of producing a toner in a carbon dioxide-containing dispersion medium, using resin fine particles containing a comb-structured resin constituted of a segment having an organopolysiloxane structure and a segment having an aliphatic polyester structure.

SUMMARY OF THE INVENTION

However, it was found that resin particles having a good particle size distribution were not necessarily obtained with the method described in Japanese Patent Application Laid-open No. 2010-132851. When the cause of this was investigated, the resin fine particles that are the dispersing agent used in this method exhibited a weak affinity for the carbon dioxide dispersion medium and a weak affinity for the resin solution, and a good particle size distribution was then presumably not obtained due to an inability to adequately segregate to the droplet/dispersion medium interface.

When, on the other hand, the present inventors investigated resin particle production based on the method described in Japanese Patent Application Laid-open No. 2013-137535, resin particles having a good particle size distribution could be obtained at temperature conditions of approximately 25° C. However, the particle size distribution was found to readily deteriorate when, with the goal of bringing about additional improvements in the particle size distribution, droplet formation was carried out with the droplet viscosity being reduced by using higher temperature conditions of approximately 40° C. The results of an investigation into the cause of this demonstrated that the resin fine particles used did not necessarily have an adequate resistance to organic solvent.

The present invention was achieved considering these problems and resides in providing resin fine particles that exhibit affinity for carbon dioxide and resin solutions, that exhibit an excellent solvent resistance, and that have small particle diameters (at or below submicrometer). The present invention also resides in providing production methods that, through the use of these resin fine particles as the dispersing agent, can stably produce resin particles and toner that have a sharp particle size distribution.

The present invention relates to a method of producing a toner comprising a toner particle, the method having the steps of:

a) mixing a resin fine particle, an organic solvent, and a resin R with a dispersion medium that contains carbon dioxide, to prepare a dispersion, in which a droplet containing the resin R is dispersed in the dispersion medium, and a surface of the droplet being covered with the resin fine particle; and b) removing the organic solvent contained in the droplet and dispersion medium by flowing carbon dioxide under pressurization through the dispersion, wherein the resin fine particle contains one or more resins that have a partial structure A, a partial structure B, and a partial structure C, the resin fine particle is soluble in chloroform, a resin A constituted of only the partial structure A and a resin B constituted of only the partial structure B are soluble in the organic solvent, a resin C constituted of only the partial structure C is insoluble in the organic solvent, and the resin fine particle satisfies following formulas (1) and (2):

$$|SP_R - SP_A| \leq 2.0 \qquad \text{formula (1)}$$

$$3.0 \leq (SP_A - SP_B) \qquad \text{formula (2)}$$

where, $SP_A$ represents an SP value of the partial structure A, $SP_R$ represents an SP value of the resin R, and $SP_B$ represents an SP value of the partial structure B.

The present invention further relates to a method of producing a resin particle, the method having the step of:

mixing a resin fine particle, an organic solvent, and a resin R with a dispersion medium that contains carbon dioxide, to prepare a dispersion, in which a droplet containing the resin R is dispersed in the dispersion medium, and a surface of the droplet being covered with the resin fine particle, wherein the resin fine particle contains one or more resins that contain a partial structure A, a partial structure B, and a partial structure C, the resin fine particle is soluble in chloroform, a resin A constituted of only the partial structure A and a resin B constituted of only the partial structure B are soluble in the organic solvent, a resin C constituted of only the partial structure C is insoluble in the organic solvent, and the resin fine particle satisfies following formulas (1) and (2):

$$|SP_R - SP_A| \leq 2.0 \quad \text{formula (1)}$$

$$3.0 \leq (SP_A - SP_B) \quad \text{formula (2)}$$

where, $SP_A$ represents an SP value of the partial structure A, $SP_R$ represents an SP value of the resin R, and $SP_B$ represents an SP value of the partial structure B.

The present invention further relates to a resin fine particle containing a resin X that has a partial structure A, a partial structure B, and a partial structure C, wherein following formula (2) is satisfied $$3.0 \leq (SP_A - SP_B) \quad \text{formula (2)}$$

where $SP_A$ is an SP value of the partial structure A and $SP_B$ is an SP value of the partial structure B, a resin A constituted of only the partial structure A and a resin B constituted of only the partial structure B are soluble in an organic solvent, a resin C constituted of only the partial structure C is insoluble in the organic solvent, and the organic solvent is at least one selected from the group consisting of acetone, ethyl acetate, methyl ethyl ketone, tetrahydrofuran, and 2-phenylethyl alcohol.

The present invention further relates to a resin fine particle containing a resin Y having a partial structure A and a partial structure C and a resin Z having a partial structure B and a partial structure C, wherein following formula (2) is satisfied $$3.0 \leq (SP_A - SP_B) \quad \text{formula (2)}$$

where $SP_A$ is an SP value of the partial structure A and $SP_B$ is an SP value of the partial structure B, a resin A constituted of only the partial structure A and a resin B constituted of only the partial structure B are soluble in an organic solvent, a resin C constituted of only the partial structure C is insoluble in the organic solvent, and the organic solvent is at least one selected from the group consisting of acetone, ethyl acetate, methyl ethyl ketone, tetrahydrofuran, and 2-phenylethyl alcohol.

The present invention can thus provide resin fine particles that exhibit an excellent solvent resistance, that exhibit affinity for carbon dioxide and resin solutions, and that have small particle diameters (at or below submicrometer). The present invention can thus also provide production methods that can stably produce resin particles and toner that have a sharp particle size distribution.

Further features of the present invention will become apparent from the following description of exemplary embodiments with reference to the attached drawings.

DESCRIPTION OF THE EMBODIMENTS

Figure 1:
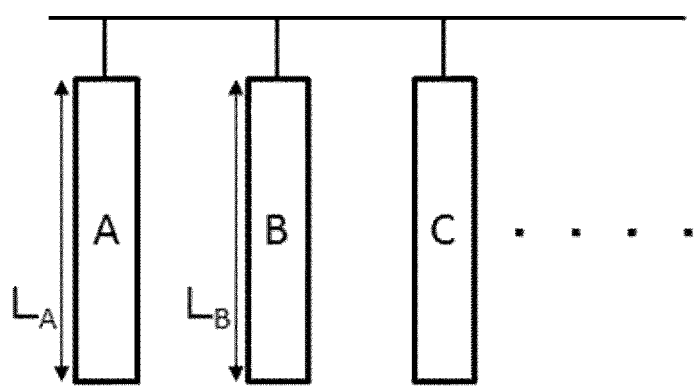
FIG. 1 is a model diagram that shows the graft structure of the resin X.

Unless specifically indicated otherwise, expressions such as "at least XX and not more than YY" and "XX to YY" that show numerical value ranges refer in the present invention to numerical value ranges that include the lower limit and upper limit that are the end points.

Embodiments of the present invention are provided herebelow and are described in additional detail, but the technical scope of the present invention is not limited to or by these embodiments.

The method of the present invention for producing a toner comprising a toner particle has the steps of:

a) mixing a resin fine particle, an organic solvent, and a resin R with a dispersion medium that contains carbon dioxide, to prepare a dispersion, in which a droplet containing the resin R is dispersed in the dispersion medium, and a surface of the droplet being covered with the resin fine particle; and b) removing the organic solvent contained in the droplet and dispersion medium by throughflow of carbon dioxide under pressurization.

The method of the present invention for producing a resin particle includes the step of:

mixing a resin fine particle, an organic solvent, and a resin R with a dispersion medium containing carbon dioxide, to prepare a dispersion, in which a droplet containing the resin R is dispersed in the dispersion medium, and a surface of the droplet being covered with the resin fine particle.

This resin particle production method preferably contains a step of removing the organic solvent contained in the droplet and dispersion medium by the throughflow of carbon dioxide under pressurization.

In the step a), first the resin R and an organic solvent capable of dissolving the resin R and optionally, for example, colorant, wax, and so forth, are combined and a resin R solution is obtained by dispersion or dissolution to uniformity using, for example, a homogenizer, ball mill, colloid mill, ultrasound disperser, and so forth.

The resin R should be a resin that dissolves in an organic solvent but is not otherwise particularly limited, and in the case of toner particle production use can be made of the resins that are used as binder resins in toners. From the standpoint of the fixing performance and heat resistance of toners, various resins, e.g., an amorphous resin, crystalline resin, or mixture thereof, can be used. The amorphous resin can be specifically exemplified by amorphous polyesters, amorphous polyurethanes, amorphous polyvinyls, and amorphous polyureas. Among these, amorphous polyesters, amorphous polyvinyls, and amorphous polyurethanes are preferred from the standpoint of being able to maintain elasticity. A single one of these may be used or two or more may be used in combination. The glass transition point (Tg) of the amorphous resin is preferably at least 40.0° C. and not more than 100.0° C. and is more preferably at least 50.0° C. and not more than 80.0° C.

The crystalline resins can be exemplified by crystalline polyesters, crystalline polyurethanes, and crystalline polyureas. A single one of these may be used or two or more may be used in combination. A crystalline resin exhibits a distinct melting peak in differential scanning calorimetric measurement using a differential scanning calorimeter (DSC). Through the incorporation of a crystalline resin, the post-melting viscosity is lowered and an excellent low-temperature fixability is exhibited. The melting point of the crystalline resin is preferably at least 50.0° C. and not more than 80.0° C. In addition, an amorphous resin may be used in combination with a crystalline resin.

Organic solvents capable of dissolving the resin R can be exemplified by the following: ketone solvents such as acetone and methyl ethyl ketone; ester solvents such as ethyl acetate and butyl acetate; ether solvents such as tetrahydrofuran, diethyl ether, and dioxane; amide solvents such as dimethylformamide and dimethylacetamide; and aromatic hydrocarbon solvents such as toluene, xylene, and 2-phenylethyl alcohol.

Among the preceding, at least one selected from the group consisting of acetone, ethyl acetate, methyl ethyl ketone, tetrahydrofuran, and 2-phenylethyl alcohol is preferred, while acetone is particularly preferred.

The resin R solution is then mixed with a dispersion medium that contains carbon dioxide (preferably liquid or supercritical carbon dioxide), to form a dispersion in which resin R-containing droplets are dispersed in the dispersion medium. Carbon dioxide may be used by itself as the dispersion medium, or an organic solvent may be present as an additional component. In such a case the carbon dioxide and organic solvent preferably form a uniform phase. In addition, the content of the carbon dioxide in the dispersion medium is preferably at least 50 mass %, more preferably at least 85 mass %, and still more preferably at least 95 mass %.

Any method may be used for the method of dispersing the resin R-containing droplet in the carbon dioxide-containing dispersion medium. A specific example here is a method in which the carbon dioxide-containing dispersion medium in a high-pressure state is introduced into a vessel containing the resin R solution. In addition, the resin R solution may be introduced using a high-pressure pump into a vessel that contains the carbon dioxide-containing dispersion medium in a high-pressure state. Here, carbon dioxide in a high-pressure state is preferably carbon dioxide at a pressure of at least 1.5 MPa.

The dispersing agent of resin fine particles may be added to the resin R solution or may be added to the carbon dioxide-containing dispersion medium. In addition, it may be added after the resin R-containing droplet has been formed. Addition dispersed in an organic solvent is preferred in such a case.

The quantity of resin fine particle addition is preferably at least 3.0 mass parts and not more than 10.0 mass parts per 100.0 mass parts of the resin R and can be adjusted as appropriate in conformity to droplet stability and the desired particle diameter.

In the step b), a toner particle or resin particle is obtained by removing the organic solvent present in the dispersion medium and the resin R-containing droplets. The organic solvent removal method is a method in which the organic solvent present in the droplet is transferred into the dispersion medium through the introduction of pressurized carbon dioxide into the vessel and is gradually removed by carbon dioxide flowthrough. The pressure within the vessel at this time is preferably at least 3.0 MPa and not more than 15.0 MPa. When the amount of carbon dioxide throughflow is inadequate and organic solvent remains in the toner particle or resin particle, the toner particle or resin particle may redissolve or may aggregate during recovery of the toner particle or resin particle. Thus, removal of the organic solvent with the carbon dioxide is preferably carried out until the organic solvent has been completely removed.

The amount of throughflowed carbon dioxide is preferably at least 1-fold and not more than 100-fold the volume of the dispersion medium, and is more preferably at least 1-fold and not more than 50-fold and is still more preferably at least 1-fold and not more than 30-fold.

With regard to the depressurization of the pressure-resistant vessel to recover the toner particle or resin particle from the carbon dioxide-containing dispersion in which the toner particle or resin particle is dispersed, pressure reduction to normal pressure may be carried out all at once; however, a stagewise pressure reduction may be performed by providing independently pressure-controlled vessels in multiple stages.

The resin fine particle, by coating the surface of the resin R-containing droplet, functions as a dispersing agent for improving the dispersion stability of the droplet. In order to improve the dispersion stability of the droplet, the ability to strongly adsorb to the droplet surface and the ability to induce a stable dispersion in the dispersion medium are both required. Moreover, a resistance to organic solvent by the resin fine particle is required in order to obtain a sharp particle size distribution.

As a result of intensive investigations by the present inventors, the discovery was made that—by using a resin fine particle that contains one or more resins that have the partial structure A, the partial structure B, and the partial structure C—the dispersion stability of the droplet is improved and a sharpening of the particle size distribution of the resin particle or toner particle can be achieved. Here, the partial structure A has the functionality of adsorbing to the droplet surface, the partial structure B functions to bring about a stable dispersion in the dispersion medium, and the partial structure C exhibits resistance to organic solvent. By using a partial structure format to provide the resin fine particle with adsorbability to the droplet surface, dispersibility in the dispersion medium, and resistance to organic solvent, the resin can be more effectively provided with these functionalities than in the case of a resin fine particle obtained by the simple random copolymerization of monomers capable of expressing these functionalities.

The use for the resin fine particle of a resin having a chemically crosslinked structure is also a method for providing a resin fine particle with an excellent solvent resistance. However, an overly high crosslink density in the resin can affect the fixing performance in toner applications. A too low crosslink density in the resin, on the other hand, does not support raising the resistance to organic solvent. It is thus necessary to exercise a very precise control of the crosslink density in the resin fine particle in order to have the toner fixing performance coexist with a high resistance to organic solvent. In contrast to this, a highly solvent-resistant resin fine particle is obtained, independently of the chemical crosslinking, by the incorporation in the resin fine particle of the partial structure C that supports the appearance of resistance to organic solvents.

Thus, the maintenance of the fixing performance can be made to coexist with a sharpening of the particle size distribution of the toner particle through the use, in accordance with the toner production method of the present invention, of a resin fine particle containing the partial structure A, the partial structure B, and the partial structure C.

The resin fine particle of the present invention is described in detail in the following.

The partial structure A functions to provide the resin fine particle with affinity for the resin R-containing droplet. Affinity between the partial structure A and resin R can be secured by having following formula (1) be satisfied.

$$|SP_R - SP_A| \leq 2.0 \qquad \text{formula (1)}$$

(In formula (1), $SP_A$ represents the SP value of the partial structure A and $SP_R$ represents the SP value of the resin R.)

The SP value, which is also referred to as the solubility parameter, is a numerical value used as an index of the solubility or affinity and represents the extent to which one substance is soluble in another substance. Two substances have a higher solubility or affinity therebetween as their SP values are closer, while the solubility or affinity therebetween is low when the SP values are distant from each other. The SP value can be calculated using software for computing solubility parameters (Hansen Solubility Parameters in Practice).

The unit used for the SP value in the present invention is $(J/m^3)^{1/2}$, but conversion to the unit of $(cal/cm^3)^{1/2}$ can be carried out using $1 \ (cal/cm^3)^{1/2} = 2.046 \times 10^3 \ (J/m^3)^{1/2}$.

$SP_A$ and $SP_R$ preferably also satisfy following formula (1-2).

$$0 \leq |SP_R - SP_A| \leq 1.0 \qquad \text{formula (1-2)}$$

In addition, a resin A constituted of only the partial structure A is soluble in organic solvent.

In the present invention, soluble in organic solvent indicates that the organic solvent-soluble fraction of the resin is at least 90.0 mass % at 25° C. By having the resin A exhibit such a high soluble fraction, when the partial structure A, which is the constituent material of the resin A, is introduced into the resin fine particle, the partial structure A then exhibits a high mobility in the granulation space comprising the resin R-containing droplet and the carbon dioxide-containing dispersion medium. Due to this, a high adsorbability by the resin fine particle to the surface of the resin R-containing droplet can be provided.

The partial structure B functions to provide the resin fine particle with affinity for the carbon dioxide-containing dispersion medium. This functionality can be secured by having the relationship between the SP values of the partial structure A and the partial structure B satisfy following formula (2).

$$3.0 \leq (SP_A - SP_B) \qquad \text{formula (2)}$$

(In formula (2), $SP_A$ represents the SP value of the partial structure A and $SP_B$ represents the SP value of the partial structure B.)

By having the partial structure B satisfy formula (2), $SP_B$ then assumes a value sufficiently smaller than $SP_A$ that it takes on a value nearer to that of carbon dioxide, which has a small SP value, than the resin R or the partial structure A.

The partial structure B can then exhibit a high affinity for the carbon dioxide-containing dispersion medium.

$SP_A$ and $SP_B$ preferably satisfy following formula (2-2).

$$3.5 \leq (SP_A - SP_B) \leq 12.5 \qquad \text{formula (2-2)}$$

A resin B constituted of only the partial structure B is also soluble in organic solvent. By having the resin B exhibit such a high soluble fraction, when the partial structure B, which is the constituent material of the resin B, is introduced into the resin fine particle, the partial structure B then exhibits a high mobility in the aforementioned granulation space. As a result, a high dispersibility in the carbon dioxide-containing dispersion medium can be imparted to the resin fine particle.

In addition, the relationship among $SP_A$, $SP_B$, and $SP_R$ preferably satisfies following formula (4).

$$(SP_A + SP_B)/2 < SP_R \qquad \text{formula (4)}$$

By satisfying formula (4) in addition to formula (2), $SP_A$ assumes a value nearer to $SP_R$ than does $SP_B$. Due to this, the partial structure A then has a higher affinity for the resin R than does the partial structure B. Thus, the partial structure A exhibits the higher adsorbability to the resin R-containing droplet, and in combination with this the partial structure B exhibits the higher dispersibility with respect to the carbon dioxide-containing dispersion medium.

The partial structure C functions to provide the resin fine particle with resistance to organic solvent. A resin C constituted of only the partial structure C is insoluble in organic solvent. In the present invention, insoluble in an organic solvent indicates that the fraction of the resin soluble in an organic solvent at 25° C. is not more than 10.0 mass %. By having the soluble fraction in the resin C be as low as this, solvent resistance in the aforementioned granulation space is exhibited when the partial structure C, which is the constituent material of the resin C, is introduced into the resin fine particle.

A high solvent resistance can be imparted to the resin fine particle of the present invention because the organic solvent-insoluble partial structure C is incorporated in the resin fine particle in addition to the partial structure A and the partial structure B. On the other hand, since the solvent resistance of the resin fine particle does not depend on chemically crosslinked structures, the resin fine particle is soluble in chloroform. In the present invention, soluble in chloroform indicates that the fraction of the resin fine particle that is soluble in chloroform at 25° C. is at least 90.0 mass %. By having such a distinctive solvent resistance, the function of the resin fine particle of the present invention as a dispersing agent for obtaining a toner having a sharp particle size distribution, can coexist with the ability to suppress effects on the fixing performance of the toner.

The partial structure A should be a structure that satisfies formula (1), but is not otherwise particularly limited and may be selected as appropriate in conformity to the type of the resin R used. The amorphous resin and crystalline resin described for the resin R can be used.

The number-average molecular weight (Mn) of the partial structure A is preferably at least 3,000 and not more than 50,000. When the Mn of the partial structure A is at least 3,000 and not more than 50,000, adsorption to the resin R-containing droplet is then facilitated and in addition the molecular weight of the resin constituting the resin fine particle is also not excessively large and the resin fine particle can be produced in an advantageous manner.

The content of the partial structure A in the resin fine particle is preferably at least 10.0 mass % and not more than 40.0 mass % with reference to the total resin constituting the resin fine particle. When this range is adopted, the content ratio with the partial structure B assumes a favorable range and adsorption to the resin R-containing droplet is facilitated. At least 15.0 mass % and not more than 35.0 mass % is more preferred.

On the other hand, the content of the partial structure B in the resin fine particle is preferably at least 15.0 mass % and not more than 60.0 mass % with reference to the total resin constituting the resin fine particle. At least 20.0 mass % and not more than 50.0 mass % is more preferred.

The chain length $L_B$ of the partial structure B is preferably at least 18,000 pm and not more than 120,000 pm. When this range is adopted, dispersibility in the dispersion medium can be effectively imparted to the resin fine particle, and in addition the molecular weight of the resin constituting the resin fine particle is also not excessively large and the resin fine particle can be produced in an advantageous manner. $L_B$ is more preferably at least 18,500 pm and not more than 50,000 pm.

The ratio ($L_A/L_B$) between the chain length $L_A$ of the partial structure A and the chain length $L_B$ of the partial structure B is preferably at least 1.6 and not more than 4.5. When the ratio ($L_A/L_B$) is in the indicated range, the ability of the resin fine particle to adsorb to the resin R-containing droplet surface is stronger and coexistence with a higher affinity for the carbon dioxide-containing dispersion medium can be brought about. The ratio ($L_A/L_B$) is more preferably at least 2.0 and not more than 3.5.

The chain length $L_A$ of the partial structure A is preferably at least 10,000 pm and not more than 100,000 pm, and more preferably at least 18,000 pm and not more than 60,000 pm.

$L_A$ and $L_B$ can be controlled through alterations in the polymerization conditions, the type of macromonomer used, and the type of macroinitiator used.

The partial structure B preferably has the organopolysiloxane structure represented by following formula (3).

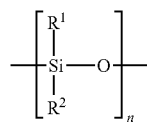

(In formula (3), $R^1$ and $R^2$ each independently represent an alkyl group having 1 to 3 carbons and n is an integer that is 2 to 150.)

The organopolysiloxane structure has a high affinity for carbon dioxide-containing dispersion medium, and as a consequence a resin fine particle containing a unit having an organopolysiloxane structure has the ability to maintain the dispersion in the dispersion medium without aggregation.

The $R^1$ and $R^2$ in the unit having the organopolysiloxane structure with formula (3) are preferably the methyl group. The resin fine particle preferably contains at least 5.0 mass % and not more than 30.0 mass % of silicon atom originating with the organopolysiloxane structure, while a content of at least 7.0 mass % and not more than 18.0 mass % is more preferred. When this range is adopted, the content ratio with the partial structure A assumes a favorable range and adsorption by the resin fine particle to the resin R-containing droplet is facilitated.

The partial structure C preferably is a crystalline resin. The influence on the fixing performance of the toner can be further diminished when the partial structure C, which imparts organic solvent resistance to the resin fine particle, is a crystalline resin. By having the partial structure C be a crystalline resin, the post-melting viscosity can be reduced and the influence on the fixing performance of the toner can be diminished. Viewed from the standpoint of the influence on the fixing performance, the melting point of the crystalline resin is preferably at least 70° C. and not more than 120° C. and is more preferably at least 75° C. and not more than 100° C. The resistance of the resin fine particle to organic solvent can be further enhanced when the crystalline resin has a melting point of at least 70° C.

The melting point of the crystalline resin can be measured under the following conditions using a DSC Q1000 (TA Instruments).
ramp rate: 10° C./min
measurement start temperature: 20° C.
measurement end temperature: 180° C.

Temperature correction in the instrument detection section is performed using the melting points of indium and zinc, and the amount of heat is corrected using the heat of fusion of indium.

Specifically, approximately 2 mg of the sample is exactly weighed out and this is introduced into a silver pan, and the differential scanning calorimetric measurement is carried out using an empty silver pan for reference. The measurement is run by initially heating to 180° C., then cooling to 20° C., and then reheating. The melting point is taken to be the temperature at the maximum endothermic peak in the DSC curve in the range from a temperature of 20° C. to 180° C. in this second heating process. When a plurality of peaks are present, the peak with the largest endothermic quantity is designated as the maximum endothermic peak.

The crystalline resin can be exemplified by crystalline polyesters, crystalline alkyl resins, crystalline polyurethanes, and crystalline polyureas. A single one of these may be used or two or more may be used in combination. Crystalline polyesters are preferred thereamong.

Crystalline polyesters can be exemplified by polyester resins obtained by the reaction of an aliphatic diol with an aliphatic dicarboxylic acid and polyester resins obtained by the ring-opening polymerization of an aliphatic lactone. In the case of polyester resins obtained by the reaction of an aliphatic diol with an aliphatic dicarboxylic acid, these are preferably the condensation polymerization product from an aliphatic diol having at least 2 and not more than 20 carbons and an aliphatic dicarboxylic acid having at least 2 and not more than 20 carbons.

The aliphatic diol is preferably a straight-chain form. A polyester having a higher crystallinity is obtained by adopting a straight-chain form. That is, a straight-chain aliphatic diol having at least 2 and not more than 20 carbons is preferred. A single such diol may be used by itself or two or more may be used in combination.

The following are more preferred in terms of imparting insolubility in organic solvent: 1,9-nonanediol, 1,10-decanediol, 1,12-dodecanediol, 1,13-tridecanediol, 1,14-tetradecanediol, 1,18-octadecanediol, and 1,20-eicosanediol.

The aliphatic dicarboxylic acid is preferably a straight-chain form from the standpoint of obtaining polyester having a higher crystallinity. That is, a straight-chain aliphatic dicarboxylic acid having at least 2 and not more than 20 carbons is preferred. A lower alkyl ester or the anhydride of an aliphatic dicarboxylic acid may also be used.

Sebacic acid, adipic acid, 1,10-decanedicarboxylic acid, their lower alkyl esters, and their anhydrides are more preferred. A single one of these may be used by itself or a mixture of two or more may be used.

An aromatic carboxylic acid may also be used. Aromatic dicarboxylic acids can be exemplified by terephthalic acid, isophthalic acid, 2,6-naphthalenedicarboxylic acid, and 4,4'-biphenyldicarboxylic acid.

Aliphatic lactones can be exemplified by δ-hexanolactone, δ-octanolactone, ε-caprolactone, δ-dodecanolactone, α-methyl-γ-butyrolactone, β-methyl-δ-valerolactone, ω-pentadecanolactone, glycolide, lactide, and so forth. ω-pentadecanolactone is preferred among the preceding from the standpoint of conferring insolubility in organic solvent.

There are no particular limitations on the method for producing the crystalline polyester, and production may be carried out using an ordinary polyester polymerization method in which a dicarboxylic acid component is reacted with a diol component. For example, production may be carried out using a direct polycondensation method or a transesterification method as appropriate in accordance with the monomer species. Production of the crystalline polyester is preferably carried out at a polymerization temperature between 180° C. and 230° C.

Catalysts that can be used in production of the crystalline polyester can be exemplified by titanium catalysts such as titanium tetraethoxide, titanium tetrapropoxide, titanium tetraisopropoxide, and titanium tetrabutoxide, and by tin catalysts such as dibutyltin dichloride, dibutyltin oxide, and diphenyltin oxide.

The crystalline alkyl resin is, for example, a resin provided by the polymerization of vinyl monomer that contains a straight-chain alkyl group in its molecular structure. The vinyl monomer containing a straight-chain alkyl group in its molecular structure is preferably an alkyl acrylate or alkyl methacrylate in which the alkyl group has at least 12 carbons. The following are examples: lauryl acrylate, lauryl methacrylate, myristyl acrylate, myristyl methacrylate, cetyl acrylate, cetyl methacrylate, stearyl acrylate, stearyl methacrylate, eicosyl acrylate, eicosyl methacrylate, behenyl acrylate, and behenyl methacrylate. A single one of these may be used or two or more may be used in combination. This crystalline alkyl resin is obtained by polymerization at a temperature preferably of at least 40° C. and more preferably of at least 50° C. and not more than 90° C.

The content of the partial structure C with respect to the total resin constituting the resin fine particle is preferably at least 30.0 mass % and not more than 70.0 mass %. When this range is adopted, the solvent resistance of the resin fine particle can coexist with the adsorbability to the droplet and the affinity for the dispersion medium.

The fraction of the resin fine particle soluble in the organic solvent is preferably not more than 35.0 mass %.

In the case of use of the resin fine particle as a dispersing agent in the dissolution suspension method, when the soluble fraction is not more than 35.0 mass %, the resin fine particle functions favorably as a finely particulate dispersing agent and the particle size distribution is then sharp. The soluble fraction is more preferably not more than 25.0 mass % and is still more preferably not more than 20.0 mass %. While the lower limit is not particularly limited, it is preferably at least 15.0 mass %, more preferably at least 1.0 mass %, and still more preferably equal to or greater than 0 mass %.

The resin fine particle preferably contains a resin X that has the partial structure A, the partial structure B, and the partial structure C. By having the resin X contain all of partial structures A, B, and C, a molecular structure is then provided, in the form of a single resin, in which the partial structure A and partial structure B, which are soluble in organic solvent, are chemically bonded to the partial structure C. As a result, a partial elution of the partial structure A and the partial structure B does not occur and a highly solvent-resistant resin fine particle can be provided while maintaining the ability to increase the dispersion stability of the resin R-containing droplet. Moreover, since only the resin X will be subjected to microparticulation, the microparticulation step is then simple and convenient and the productivity is enhanced.

A preferred embodiment of the resin X is a graft polymer having the partial structure A, the partial structure B, and the partial structure C each as branch segments. This graft polymer in the present invention is a polymer in which the partial structure A, the partial structure B, and the partial structure C are bonded to the main chain as branch segments (side chains) (FIG. 1). In this case, the main chain need not have a functionality as exercised by the partial structures A, B, and C and functions to connect the individual partial structures. The carbon-carbon bond is an example of the main chain. Such a resin X, i.e., which contains each partial structure as a branch segment (side chain) on a main chain, can be obtained by introducing a reactive functional group into the particular partial structure or at a terminal of the particular partial structure and polymerizing. This reactive functional group is preferably the vinyl group for its ease of introduction into each partial structure and its ease of polymerization.

Each of the following copolymers (I) to (III) is another preferred embodiment of the resin X (FIG. 2):

(I) copolymer in which a segment having the partial structure A as a trunk segment is bonded to a segment comprising a graft polymer in which the partial structure B and the partial structure C are branch segments, (II) copolymer in which a segment having the partial structure B as a trunk segment is bonded to a segment comprising a graft polymer in which the partial structure A and the partial structure C are branch segments, and (III) copolymer in which a segment having the partial structure C as a trunk segment is bonded to a segment comprising a graft polymer in which the partial structure A and the partial structure B are branch segments.

In the present invention, a trunk segment, for example, in the polymer chain constituting the resin X, is a segment that includes the main chain and is constituted from a prescribed monomer composition. In the present case, it includes the polymer main chain and functions as a partial structure.

The dispersing agent performance of the resin fine particle can be further increased by judicious design in the resin X of the chain length $L_B$ of the partial structure B and the ratio ($L_A/L_B$) between the chain length $L_A$ of the partial structure A and the chain length $L_B$ of the partial structure B. Here, the chain length $L_A$ is the length of the segment that functions to adsorb to the droplet surface while the chain length $L_B$ is the length of the segment that functions to provide a stable dispersion in the dispersion medium. In the graft polymer shown in FIG. 1, since the particular branch segment is formed by the random copolymerization of monomer bearing the partial structure A or monomer bearing the partial structure B, the chain lengths $L_A$ and $L_B$ are thus the $L_A$ and $L_B$ respectively indicated in FIG. 1 by the arrows. The chain lengths $L_A$ and $L_B$ can be calculated using the covalent bond radii of the atoms that respectively constitute the particular partial structures and correspond to the length when the molecular chain constituting the particular partial structure is fully extended.

Figure 2:
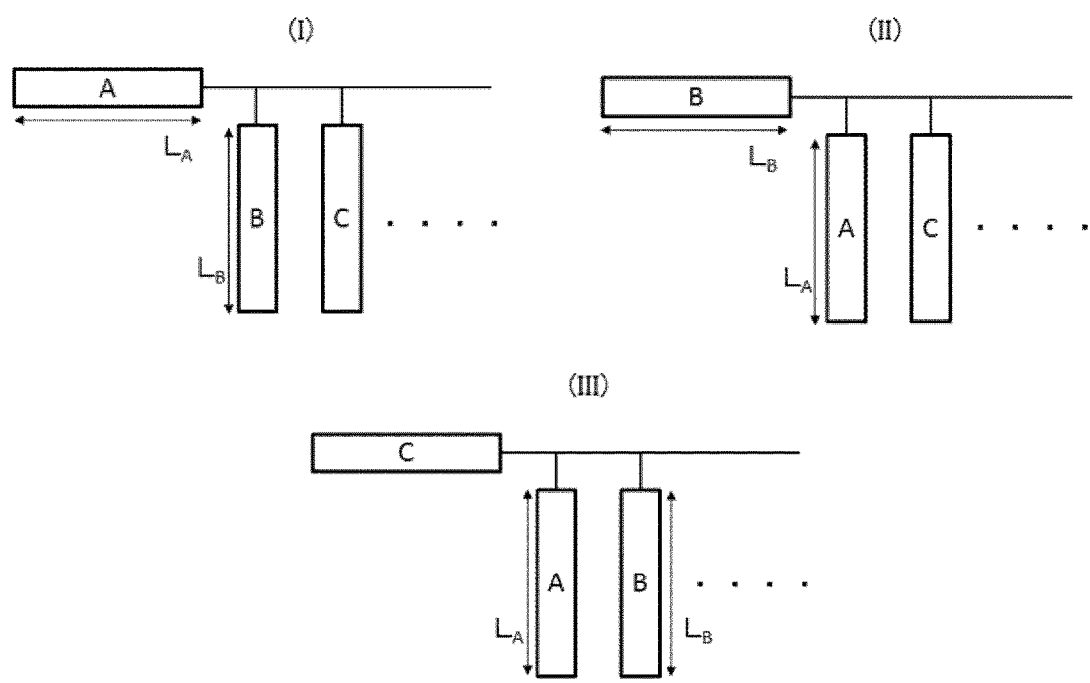
FIG. 2 is model diagrams that show structures (I) to (III) in the resin X.

The chain lengths $L_A$ and $L_B$ are given in FIG. 2 for the aforementioned copolymers (I) to (III), respectively. For (I), since the partial structure A constitutes a trunk segment, the chain length $L_A$ corresponds to the length of this trunk segment. With regard to the chain length $L_B$, since, as in FIG. 1, the particular branch segment is formed by the random copolymerization of monomer bearing the partial structure B, the length of the branch segment corresponds to $L_B$. The same analysis as for (I) can also be applied to (II). Moreover, for each of the branch segments in (III), the length of the particular branch segment is $L_A$ or $L_B$, since, as in FIG. 1, a monomer bearing the partial structure A or a monomer bearing the partial structure B has been randomly copolymerized.

The resin fine particle preferably contains a resin Y having the partial structure A and the partial structure C and a resin Z having the partial structure B and the partial structure C. Through the incorporation of the resin Y and the resin Z, the partial structure A in the resin Y and the partial structure B in the resin Z are each chemically bonded to the partial structure C and partial elution then does not occur. In addition, the content ratio between the partial structure A and the partial structure B in the resin fine particle, which is critical to the performance as a dispersing agent, can then also be readily controlled by altering the mixing ratio between the resin Y and the resin Z. Moreover, since the resin Y and the resin Z also contain a lower number of partial structures than the resin X, the production consistency in the synthesis of these resins is high.

Figure 3:
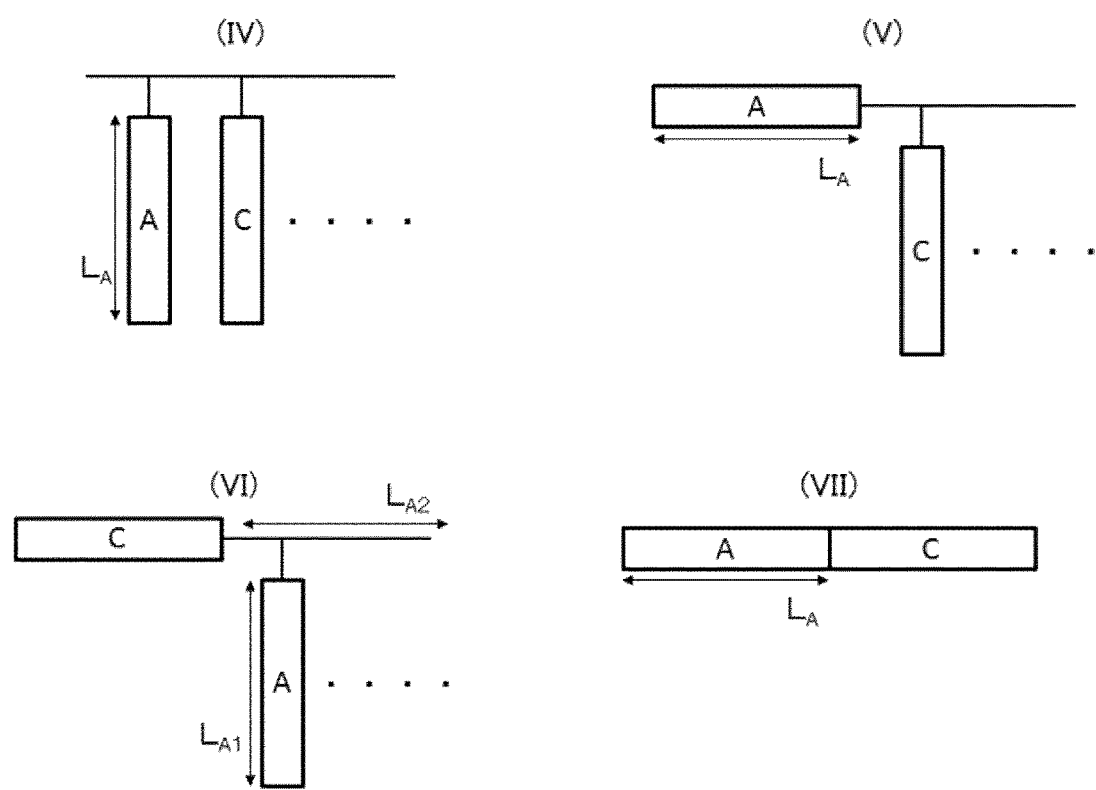
FIG. 3 is model diagrams that show structures (IV) to (VII) for the resin Y.

The resin Y is preferably any of the following polymers (IV) to (VII) (FIG. 3).

Figure 4:
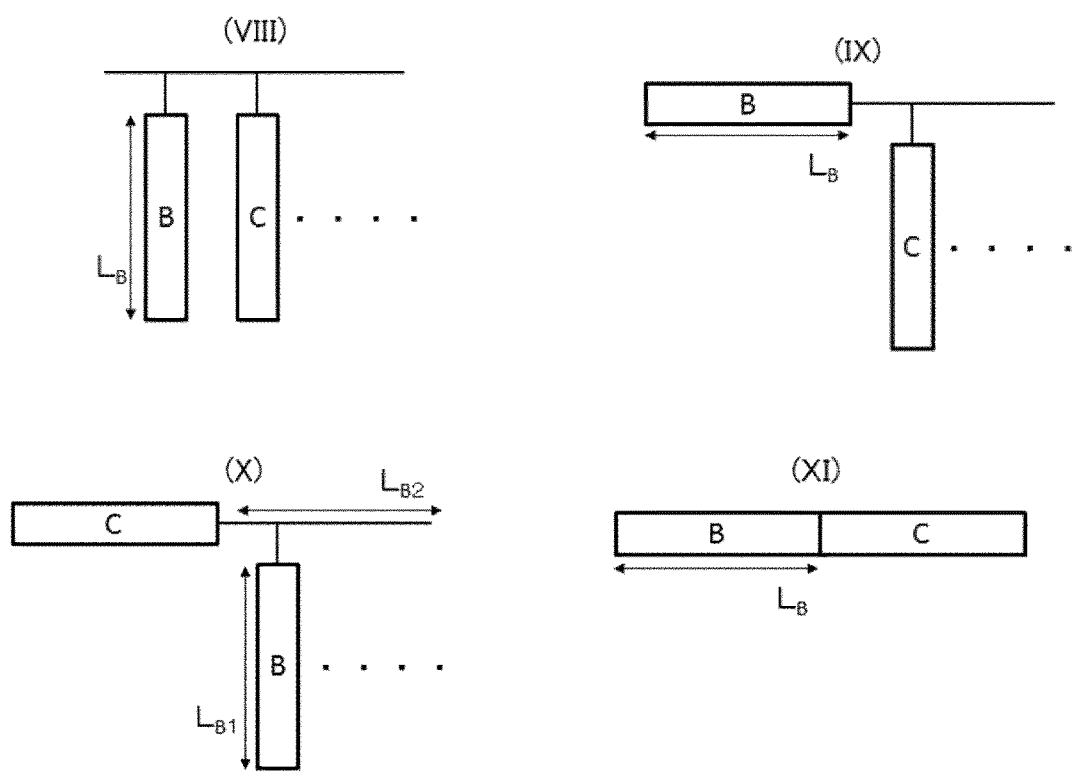
FIG. 4 is model diagrams that show structures (VIII) to (XI) for the resin Z.

(IV) graft polymer having the partial structure A and the partial structure C as branch segments (V) copolymer in which a segment having the partial structure A as a trunk segment is bonded to a segment comprising a graft polymer having the partial structure C as a branch segment (VI) copolymer in which a segment having the partial structure C as a trunk segment is bonded to a segment comprising a graft polymer having the partial structure A as a branch segment (VII) copolymer in which a segment having the partial structure A as a trunk segment is bonded to a segment having the partial structure C as a trunk segment The resin Z is preferably any of the following polymers (VIII) to (XI) (FIG. 4).

(VIII) graft polymer having the partial structure B and the partial structure C as branch segments (IX) copolymer in which a segment having the partial structure B as a trunk segment is bonded to a segment comprising a graft polymer having the partial structure C as a branch segment (X) copolymer in which a segment having the partial structure C as a trunk segment is bonded to a segment comprising a graft polymer having the partial structure B as a branch segment (XI) copolymer in which a segment having the partial structure B as a trunk segment is bonded to a segment having the partial structure C as a trunk segment The resin fine particle preferably contains the combination of at least one of (IV) to (VII) for the resin Y and at least one of (VIII) to (XI) for the resin Z. This combination may be any combination, and two or more of resin Y and two or more of resin Z may be incorporated.

The chain length $L_A$ in each copolymer indicated in (IV) to (VII) is illustrated in FIG. 3. In (IV), just as in FIG. 1, $L_A$ is the length of the branch segment due to monomer bearing the partial structure A having been randomly copolymerized. In addition, in (V) and (VII), the partial structure A constitutes a trunk segment and due to this the chain length $L_A$ corresponds to this trunk segment. In (VI), on the other hand, the chain length $L_A$ is defined as the longer of the length $L_{A1}$ of the branch segment and the length $L_{A2}$ of the main chain that bears the branch segment. As previously indicated, the chain length $L_A$ of the partial structure A in the present invention is the length of the segment that functions to adsorb to the droplet surface. With (VI), when conversion to high molecular weight has been carried out by the polymerization of monomer bearing the partial structure A as a side chain, the length $L_{A2}$ of the main chain that bears the branch segment may be longer than the length $L_{A1}$ of the branch segment. Since the functionality of adsorbing to the droplet surface is enhanced with a longer length $L_{A1}$ for the branch segment or a longer length $L_{A2}$ for the main chain, in the present invention the chain length $L_A$ is taken to be the longer of the length $L_{A1}$ of the branch segment and the length $L_{A2}$ of the main chain that bears the branch segment.

In addition, the branch segment-bearing main chain may contain, in addition to a unit derived from the partial structure A-bearing monomer, a unit derived from a low molecular weight monomer having a molecular weight of not more than 200, such as styrene or methyl methacrylate. The basis for this is as follows: these low molecular weight monomers, while not having the functionality of adsorbing to the droplet surface, through their random copolymerization with partial structure A-bearing monomer, act via the main chain as a whole as a segment that has the functionality of adsorbing to the droplet surface.

The chain length $L_B$ is illustrated in FIG. 4 for each of the aforementioned copolymers (VIII) to (XI). The chain length $L_B$ in FIG. 4 is defined in the same manner as the chain length $L_A$ in FIG. 3. For (VIII), as in FIG. 1, $L_B$ is taken to be the length of the branch segment due to a partial structure B-bearing monomer having been randomly copolymerized. In (IX) and (XI), because the partial structure B constitutes a trunk segment, the chain length $L_B$ corresponds to the length of this trunk segment. In (X), on the other hand, the chain length $L_B$ is defined as the longer of the length $L_{B1}$ of the branch segment and the length $L_{B2}$ of the main chain that bears the branch segment. As previously indicated, the chain length $L_B$ of the partial structure B is the length of the segment that functions to provide a stable dispersion in the dispersion medium. With (X), when conversion to high molecular weight has been carried out by the polymerization of monomer bearing the partial structure B as a side chain, the length $L_{B2}$ of the main chain that bears the branch segment may be longer than the length $L_{B1}$ of the branch segment. Since the functionality of providing a stable dispersion in the dispersion medium is enhanced with a longer length $L_{B1}$ for the branch segment or a longer length $L_{B2}$ for the main chain, in the present invention the chain length $L_B$ is taken to be the longer of the length $L_{B1}$ of the branch segment and the length $L_{B2}$ of the main chain that bears the branch segment.

In addition, the branch segment-bearing main chain may contain, in addition to a unit derived from the partial structure B-bearing monomer, a unit derived from a low molecular weight monomer having a molecular weight of not more than 200, such as styrene or methyl methacrylate. The basis for this is as follows: these low molecular weight monomers, while not independently having a dispersion functionality, through their random copolymerization with partial structure B-bearing monomer, act as a segment that has the functionality of providing a stable dispersion in the dispersion medium.

The partial structure C in the resin Y preferably has the same composition as the partial structure C in the resin Z. By adopting the same composition, there is then little difference in composition between the resin Y and the resin Z and the compositional uniformity of the resin fine particle provided by precipitation-induced microparticulation, infra, can be increased.

The volume-average particle diameter of the resin fine particle is preferably at least 50 nm and not more than 300 nm.

When a resin fine particle is used as a dispersing agent in the dissolution suspension method, a resin fine particle having a certain size is preferably used as the dispersing agent in order to prevent droplet coalescence by providing steric repulsion between droplets. In addition, in order to avoid facilitating liberation of the resin fine particle from the droplet surface until the resin particle has been obtained, preferably a large attractive force acting between the resin fine particle and the droplet is established. As a consequence, the use is preferred as the dispersing agent of a resin fine particle that provides a large particle diameter difference between the droplet and the resin fine particle, i.e., that has a certain fineness. Thus, the volume-average particle diameter of the resin fine particle is preferably controlled into the aforementioned range in order to obtain a toner particle or resin particle having an excellent particle size distribution.

The volume-average particle diameter distribution of the resin fine particle is more preferably at least 80 nm and not more than 250 nm.

Examples of methods for producing the resin X, resin Y, and resin Z are described below, but there is no limitation to or by these.

Resin X

Ordinary radical polymerization can be used as a method for synthesizing the graft polymer shown in FIG. 1 among the structural patterns available for the resin X.

Macromonomers bearing partial structures A, B, and C are preferably used as the monomers constituting the graft polymer of resin X.

A macromonomer bearing a partial structure A that satisfies formula (1) can be used for the partial structure A. Commercial macromonomers in this regard are AS-6 (styrene macromonomer, Toagosei Co., Ltd.), AA-6 (methyl methacrylate macromonomer, Toagosei Co., Ltd.), AN-6 (styrene-acrylonitrile macromonomer, Toagosei Co., Ltd.), and AB-6 (butyl acrylate macromonomer, Toagosei Co., Ltd.). Also usable is macromonomer obtained by the introduction of a polymerizable unsaturated group into a polymer containing a partial structure A that satisfies formula (1).

For example, the following method can be used to obtain a macromonomer by the introduction of a polymerizable unsaturated group into the terminal position of a polyester structure:

1. a method in which coupling is carried out between a radical-polymerizable compound and a polyester produced by the ring-opening polymerization of the lactone ring. This is more specifically exemplified by the following:

1-1 a method in which coupling via a condensation reaction is carried out between a radical-polymerizable compound bearing a carboxy group and a polymerizable unsaturated group, and a polyester bearing a hydroxy group in terminal position and obtained by the ring-opening polymerization of a lactone compound, and 1-2 a method in which coupling via a dehydrochlorination reaction is carried out between an acid halide and a polyester bearing a hydroxy group in terminal position and obtained by the ring-opening polymerization of a lactone compound.

The following are examples of the radical-polymerizable compound bearing a carboxy group and polymerizable unsaturated group, that is used in 1-1: acrylic acid, methacrylic acid, crotonic acid, isocrotonic acid, 2-methacryloxyethyl succinate, 2-methacryloxyethyl hexahydrophthalate, and 2-methacryloxyethyl glutarate; dicarboxylic acids and their anhydrides, e.g., maleic acid and maleic anhydride, fumaric acid, and itaconic acid and itaconic anhydride; and the monoalkyl esters of dicarboxylic acids, e.g., monomethyl maleate, monoethyl maleate, monobutyl maleate, monooctyl maleate, monomethyl fumarate, monoethyl fumarate, monobutyl fumarate, monooctyl fumarate, monomethyl itaconate, monoethyl itaconate, monobutyl itaconate, and monooctyl itaconate. Acrylic acid and methacrylic acid are preferred.

A single radical-polymerizable compound bearing a carboxy group and polymerizable unsaturated group may be used by itself or two or more may be used in combination.

The acid halide used in 1-2 can be exemplified by carboxylic acid chlorides such as acryloyl chloride and methacryloyl chloride.

The following is an example of another method for obtaining a macromonomer by the introduction of a polymerizable unsaturated group at one terminal of a polyester structure:

2. a method in which coupling is carried out between a radical-polymerizable compound and a polyester produced by the polycondensation of a dicarboxylic acid with a diol.

The coupling in 2 may be the direct coupling of a terminal functional group on the polyester and a radical-polymerizable compound that contains a functional group reactive with the terminal functional group. In addition, coupling may be carried out after modification, using a coupling agent, of the terminal of the polyester to make it reactive with the functional group present on the radical-polymerizable compound.

This is more specifically exemplified by the following.

2-1 A method in which coupling is carried out by a condensation reaction between polyester bearing a carboxyl group in terminal position and a radical-polymerizable compound bearing a hydroxy group and a polymerizable unsaturated group.

In this case, the molar ratio (dicarboxylic acid/diol) between the dicarboxylic acid and diol during preparation of the polyester is preferably at least 1.02 and not more than 1.20.

2-2 A method in which coupling is carried out by a urethanation reaction between polyester bearing a hydroxy group in terminal position and a radical-polymerizable compound having an isocyanate group and a polymerizable unsaturated group.

2-3 A method in which coupling is carried out, by a urethanation reaction using a diisocyanate as the coupling agent, between polyester bearing a hydroxy group in terminal position and a radical-polymerizable compound bearing the hydroxyl group and a polymerizable unsaturated group.

The molar ratio (diol/dicarboxylic acid) between the dicarboxylic acid and diol during preparation of the polyester used in 2-2 and 2-3 is preferably at least 1.02 and not more than 1.20.

The following are examples of the radical-polymerizable compound bearing a hydroxy group and a polymerizable unsaturated group: hydroxystyrene, N-methylolacrylamide, N-methylolmethacrylamide, hydroxyethyl acrylate, hydroxyethyl methacrylate, hydroxypropyl acrylate, hydroxypropyl methacrylate, polyethylene glycol monoacrylate, polyethylene glycol monomethacrylate, allyl alcohol, methallyl alcohol, crotyl alcohol, isocrotyl alcohol, 1-butene-3-ol, 2-butene-1-ol, 2-butene-1,4-diol, propargyl alcohol, 2-hydroxyethyl propenyl ether, and sucrose allyl ether. Preferred among the preceding are hydroxyethyl acrylate and hydroxyethyl methacrylate.

The radical-polymerizable compound having an isocyanate group and a polymerizable unsaturated group can be exemplified by the following: 2-isocyanatoethyl acrylate, 2-isocyanatoethyl methacrylate, 2-(O-[1'-methylpropylideneamino]carboxyamino)ethyl methacrylate, 2-[(3,5-dimethylpyrazolyl)carbonylamino]ethyl methacrylate, and m-isopropenyl-α,α-dimethylbenzyl isocyanate. 2-isocyanatoethyl acrylate and 2-isocyanatoethyl methacrylate are particularly preferred among the preceding.

The diisocyanate can be exemplified by the following: aromatic diisocyanates having at least 6 and not more 20 carbons (excluding the carbon in the NCO group; this also applies in the following), aliphatic diisocyanates having at least 2 and not more than 18 carbons, alicyclic diisocyanates having at least 4 and not more than 15 carbons, and modifications of these diisocyanates (modifications containing the urethane group, carbodiimide group, allophanate group, urea group, biuret group, uretdione group, uretimine group, isocyanurate group, or oxazolidone group; also referred to herebelow as modified diisocyanate).

The aromatic diisocyanates can be exemplified by the following: m- and/or p-xylylene diisocyanate (XDI) and α,α,α',α'-tetramethylxylylene diisocyanate.

The aliphatic diisocyanates can be exemplified by the following: ethylene diisocyanate, tetramethylene diisocyanate, hexamethylene diisocyanate (HDI), and dodecamethylene diisocyanate.

The alicyclic diisocyanates can be exemplified by the following: isophorone diisocyanate (IPDI), dicyclohexylmethane-4,4'-diisocyanate, cyclohexylene diisocyanate, and methylcyclohexylene diisocyanate.

XDI, HDI, and IPDI are preferred among the preceding.

An organopolysiloxane structure, which has a high affinity for hydrophobic media such as carbon dioxide, is preferably used for a partial structure B-bearing macromonomer. Macromonomer having an organopolysiloxane structure can be exemplified by X-22-2475 (Shin-Etsu Chemical Co., Ltd.), X-22-174ASX (Shin-Etsu Chemical Co., Ltd.), MCR-M07 (AZmax.Co), MCR-M11 (AZmax.Co), FM-0711 (JNC Corporation), FM-0721 (JNC Corporation), and FM-0725 (JNC Corporation). In addition, two or more of these organopolysiloxane structure-bearing macromonomers may be used in combination.

The partial structure C exhibits resistance to organic solvent. An organic solvent-resistant, high-melting point crystalline resin that has been converted into a macromonomer can be used as the partial structure C-bearing macromonomer.

From the standpoint of the insolubility and polymerization reactivity, the molecular weight of the partial structure C, considered as the molecular weight of the partial structure C-bearing macromonomer, is preferably a number-average molecular weight (Mn) of at least 3,000 and not more than 30,000 and more preferably at least 3,000 and not more than 15,000.

With regard to the crystalline resin, for example, the methods described for partial structure A can be similarly used as the method for converting a crystalline polyester into a macromonomer.

With regard to the method for obtaining the resin X using macromonomers, resin X in the form of a graft polymer can be obtained by dissolving the three species, i.e., a partial structure A-bearing macromonomer, partial structure B-bearing macromonomer, and partial structure C-bearing macromonomer, in a polymerization solvent, introducing a radical polymerization initiator, and carrying out polymerization.

A low molecular weight monomer having a molecular weight of not more than 200, such as styrene or methyl methacrylate, may be used in addition to the macromonomers. This is because the low molecular weight monomer improves the polymerization reactivity of the macromonomers and thus contributes to improving the polymerization conversion. Two or more low molecular weight monomers may also be used in combination.

The polymerization solvent should be a polymerization solvent that can dissolve the macromonomers while having little inhibiting action on radical polymerization, and any such organic solvent may be used with toluene being an example.

The radical polymerization initiator is a compound that produces radicals under external excitation, e.g., the application of heat or exposure to light, and accelerates the polymerization of the polymerizable composition, and heretofore known radical polymerization initiators can be used.

The radical polymerization initiator can be specifically exemplified by azo-type radical polymerization initiators such as 2,2'-azobisisobutyronitrile, 2,2'-azobis(2-methylpropanenitrile), 2,2'-azobis(2,4-dimethylpentanenitrile), 2,2'-azobis(2-methylbutanenitrile), 1,1'-azobis(cyclohexanecarbonitrile), 2,2'-azobis(2,4-dimethyl-4-methoxyvaleronitrile), and 2,2'-azobis(2,4-dimethylvaleronitrile). Peroxide-type radical polymerization initiators are exemplified by dibenzoyl peroxide, cumene hydroperoxide, di-2-ethylhexyl peroxydicarbonate, di-sec-butyl peroxydicarbonate, acetyl peroxide, and peresters (for example, t-butyl peroctate, α-cumyl peroxypivalate, and t-butyl peroxypivalate).

The trunk segment-containing copolymers (I) to (III) (in FIG. 2), which are another structural pattern for the resin X, can be obtained by radical polymerization using a macroinitiator or can be obtained by a precision polymerization, e.g., reversible addition/fragmentation chain transfer polymerization (RAFT) or atom transfer radical polymerization (ATRP).

For example, in order to synthesize (I), a partial structure A-bearing macroinitiator is prepared by introducing a free radical-generating functional group into the partial structure A. (I) can then be obtained by dissolving this macroinitiator, a partial structure B-bearing monomer, and a partial structure C-bearing monomer in a polymerization solvent and carrying out polymerization.

(II) and (III) may also be obtained in the same manner as for (I) by similarly introducing a free radical-generating functional group into the partial structure B or the partial structure C.

That is, a preferred method for obtaining the resin X has the step of:

obtaining the resin X by the radical polymerization of a monomer having the partial structure B and a monomer having the partial structure C, using a macroinitiator that has the partial structure A and a functional group that generates a free radical;

obtaining the resin X by the radical polymerization of a monomer having the partial structure A and a monomer having the partial structure C, using a macroinitiator that has the partial structure B and a functional group that generates a free radical; or obtaining the resin X by the radical polymerization of a monomer having the partial structure A and a monomer having the partial structure B, using a macroinitiator that has the partial structure C and a functional group that generates a free radical.

Here, the free radical-generating functional group is a functional group that undergoes decomposition under the action of heat and/or light with the generation of a free radical at the decomposition site, and that can initiate polymerization from this site when monomer is present. Examples in this regard are the azo functional group, which has the —N=N— structure; the peroxide functional group, which has the —O—O— structure; and the dihalogen functional group, which has a halogen-halogen bond.

The macroinitiator is a compound that has, within the molecule, the partial structure A, the partial structure B, or the partial structure C, and also a functional group that generates a free radical as described above. When radical polymerization of macromonomer is carried out in the presence of a macroinitiator, a radical is first generated by the decomposition of the functional group in the macroinitiator. Polymerization is initiated from the thusly generated radical site, and the macromonomer undergoes addition and chain extension. As a result, a copolymer can be obtained in which a segment having the partial structure A, B, or C as a trunk segment is bonded with a segment comprising the graft polymer obtained by the polymerization of the macromonomer.

The reactivity of macromonomers is generally lower than that of low molecular weight monomers, and increasing the molecular weight or raising the conversion may be problematic in some cases. By having the polymer structure contain a trunk segment as in the (I) to (III) described above, the number of macromonomers used in the polymerization can be reduced from that for the graft polymer shown in FIG. 1, and as a consequence the controllability of the molecular weight is facilitated as is the ability to raise the polymerization conversion.

A commercial macroinitiator may be used for the macroinitiator, and, for example, a polydimethylsiloxane unit-bearing polymeric azo polymerization initiator (VPS-1001, Wako Pure Chemical Industries, Ltd.) can be used as a partial structure B-bearing macroinitiator.

The macroinitiator can be produced, for example, using the following methods.

Methods in which coupling is carried out by esterification between a hydroxy group-bearing partial structure A, partial structure B, or partial structure C and a carboxyl group-bearing compound that also has a free radical-generating functional group.

Methods in which coupling is carried out by esterification between a carboxy group-bearing partial structure A, partial structure B, or partial structure C and a hydroxy group-bearing compound that also has a free radical-generating functional group. A dehydration condensation agent can be used for the esterification of the hydroxy group with the carboxyl group. This dehydration condensation agent is exemplified by carbodiimide types, imidazole types, triazine types, phosphonium types, uronium types, and halouronium types.

In addition, for example, a RAFT polymerization can be used as another method for synthesizing (I). First, by synthesizing the partial structure A in the presence of a RAFT agent, a RAFT macromonomer can be obtained in which the RAFT agent is attached at a terminal of the partial structure A. (I) can then be obtained by dissolving the partial structure A-containing RAFT macromonomer and the respective partial structure B- and partial structure C-containing macromonomers in a polymerization solvent and carrying out polymerization using a polymerization initiator.

Not just (I), but also (II) and (III) can be obtained by this same method when the partial structure can be synthesized in the presence of a RAFT agent. For example, a dithioester or a thiocarbonylthio compound, e.g., a dithiocarbamate, trithiocarbonate, xanthate, and so forth, which are common RAFT agents, can be used as the RAFT agent here.

Resin Y, Resin Z

The graft polymer given by (IV) in FIG. 3 among the structural patterns for the resin Y and the graft polymer given by (VIII) in FIG. 4 among the structural patterns for the resin Z can be synthesized by the same polymerization methods as for the graft polymer given in FIG. 1 for the resin X.

Partial structure A- and partial structure C-bearing macromonomers can be used for the monomers constituting the resin Y graft polymer (IV). In addition, partial structure B- and partial structure C-bearing macromonomers can be used for the monomers constituting the resin Z graft polymer (VIII).

The trunk segment-containing copolymers (V) and (VI) for the resin Y (FIG. 3) and the trunk segment-containing copolymers (IX) and (X) for the resin Z (FIG. 4) can be synthesized by the same polymerization methods as for (I) to (III) in FIG. 2 for the resin X. Specifically, they can be obtained by radical polymerization using a macroinitiator or by a precision polymerization, e.g., reversible addition/fragmentation chain transfer polymerization (RAFT) or atom transfer radical polymerization (ATRP).

For example, in order to synthesize (V), a partial structure A-bearing macroinitiator is produced by introducing a free radical-generating functional group into the partial structure A. (V) can then be obtained by dissolving this macroinitiator and a partial structure C-bearing macromonomer in a polymerization solvent and carrying out polymerization.

(VI) and (IX) and (X) can also be synthesized as for (V) by similarly introducing a free radical-generating functional group into the partial structure B or the partial structure C. In addition, for example, a RAFT polymerization can be used, as with (I), as another method for synthesizing (V). First, by synthesizing the partial structure A in the presence of a RAFT agent, a RAFT macromonomer can be obtained in which the RAFT agent is attached at a terminal of the partial structure A. (V) can then be obtained by dissolving the partial structure A-containing RAFT macromonomer and a partial structure C-containing macromonomer in a polymerization solvent and carrying out polymerization using a polymerization initiator. Not just (V), but also (VI), (IX), and (X) can be obtained by this same method when the partial structure can be synthesized in the presence of a RAFT agent.

The trunk segment-containing copolymer (VII) that is another structural pattern for the resin Y in FIG. 3 and the trunk segment-containing copolymer (XI) that is another structural pattern for the resin Z in FIG. 4 can be obtained by a macroinitiator-induced radical polymerization or by a condensation reaction between the respective partial structures.

For example, a partial structure C-containing macroinitiator can be produced by the addition to the partial structure C of a free radical-generating functional group. This macroinitiator and a monomer constituted of the partial structure A are then dissolved in a polymerization solvent and polymerization is carried out to obtain (VII).

In addition, for example, a RAFT polymerization can be used, as with (I), as another method for synthesizing (VII). First, by synthesizing the partial structure C in the presence of a RAFT agent, a RAFT macromonomer can be obtained in which the RAFT agent is attached at a terminal of the partial structure C. (VII) can then be obtained by dissolving the partial structure C-containing RAFT macromonomer and a monomer constituting the partial structure A in a polymerization solvent and carrying out polymerization using a polymerization initiator.

(XI) can also be synthesized by a condensation reaction-based coupling between a partial structure C having a hydroxy group at a terminal and a partial structure B having a carboxy group at a terminal.

Due to the presence of the trunk segment as in (V) to (VII) and (IX) to (XI), the number of macromonomers used in the polymerization can be reduced from that for the graft polymer shown in FIG. 1, and as a consequence improved control of the molecular weight and an improved conversion can be obtained. In particular, with regard to (VI) and (X), which use a partial structure C-bearing macroinitiator, a fixed amount of the partial structure C can be introduced into the polymer and as a consequence the soluble fraction in the resin Y and the resin Z can be kept even lower and the solvent resistance of the resin fine particle can be further increased.

With regard to the macroinitiators used for the trunk segment-containing copolymers (V) to (VII) of resin Y (FIG. 3) and for the trunk segment-containing copolymers (IX) to (XI) of resin Z (FIG. 4), as for resin X, commercial macroinitiators may be used or the macroinitiator may be produced by the methods indicated above.

RAFT polymerization as described above may also be used.

The method of producing the resin Y preferably has a step of:

obtaining the resin Y by the radical polymerization of a monomer having the partial structure C, using a macroinitiator that has the partial structure A and a free radical-generating functional group, or obtaining the resin Y by the radical polymerization of a monomer having the partial structure A, using a macroinitiator that has the partial structure C and a free radical-generating functional group.

The method of producing the resin Z preferably has a step of:

obtaining the resin Z by the radical polymerization of a monomer having the partial structure C, using a macroinitiator that has the partial structure B and a free radical-generating functional group, or obtaining the resin Z by the radical polymerization of a monomer having the partial structure B, using a macroinitiator that has the partial structure C and a free radical-generating functional group.

The method for producing the resin fine particle is not particularly limited, and methods can be used that directly yield resin fine particles by the dispersion polymerization method, emulsion polymerization method, or miniemulsion method. Also available are methods in which a resin is pulverized; methods in which a resin is converted into liquid form by dissolution in solvent or melting and this is precipitated in an organic solvent; and methods in which microparticulation is carried out by precipitation after suspension in an aqueous medium. A known surfactant or dispersing agent may also be used here, or the resin constituting the fine particle may also be equipped with self-emulsifiability.

The method of producing a resin fine particle that contains the resin X preferably includes a step of obtaining the resin fine particle by dissolving the resin X in an organic solvent b and carrying out microparticulation by precipitating the resin X in water or an organic solvent c.

The method for producing a resin fine particle that contains the resin Y and the resin Z preferably includes a step of obtaining the resin fine particle by mixing and dissolving the resin Y and the resin Z in an organic solvent b and carrying out microparticulation by precipitating the resin Y and the resin Z in water or an organic solvent c. The mixing ratio between the resin Y and the resin Z may be freely established such that the partial structure A, partial structure B, and partial structure C present in the individual resins each assume the preferred contents described above.

The organic solvent b used to produce the resin fine particle should be able to dissolve the resins X, Y, and Z and can be exemplified by toluene, tetrahydrofuran, chloroform, and so forth.

The organic solvent c used in the precipitation of the resins X, Y, and Z is exemplified by hexane, methanol, acetone, and so forth.

For example, the resin fine particle may be obtained by dissolving the resin X, or the resin Y and the resin Z, in an organic solvent b capable of dissolving same to produce a resin solution; dispersing this resin solution in water to form a droplet having a droplet diameter at or below the submicrometer level; and thereafter removing the organic solvent b present in the droplet.

The droplet diameter and the concentration govern the particle diameter of the resin fine particle in this method. Due to this, a surfactant is preferably introduced into the water in order to form a droplet having a droplet diameter at or below the submicrometer level. The droplet dispersion stability can be improved when a surfactant is used.

The use is preferred of a low molecular weight surfactant having a weight-average molecular weight of not more than 1,000. Such a surfactant can be easily removed from the resulting resin fine particle. The surfactant can be exemplified by known anionic surfactants, cationic surfactants, and nonionic surfactants.

Specific examples of the anionic surfactant are dodecylbenzenesulfonate, decylbenzenesulfonate, undecylbenzenesulfonate, tridecylbenzenesulfonate, and nonylbenzenesulfonate and their sodium, potassium, and ammonium salts, and also sodium dodecyl sulfate. Specific examples of the cationic surfactant are cetyltrimethylammonium bromide, hexadecylpyridinium chloride, and hexadecyltrimethylammonium chloride. The nonionic surfactant can be specifically exemplified by oxyethylene-type alkyl ethers and so forth. Two or more surfactants may also be used in combination.

A disperser such as, for example, a homogenizer, ball mill, colloid mill, or ultrasound disperser may be used as the dispersing device for droplet formation.

Another example is a method for obtaining the resin fine particle by preparing a resin solution by dissolving the resin X, or the resin Y and the resin Z, in an organic solvent b capable of dissolving same and mixing this resin solution with an organic solvent c that does not dissolve the resin X or does not dissolve the resin Y and resin Z.

A disperser such as, for example, a homogenizer, ball mill, colloid mill, or ultrasound disperser may be used for mixing.

The particle diameter of the resin fine particle produced by this method depends on the state of production of the precipitation nuclei, and a resin fine particle having a smaller particle diameter is more readily obtained as smaller precipitation nuclei are produced. The production of precipitation nuclei depends on the solids concentration of the resin solution and the efficiency of mixing between the resin solution and the organic solvent c in which the resin is insoluble. The particle diameter of the resin fine particle is controlled in particular preferably by adjusting the solids concentration of the resin solution, and a resin fine particle with a smaller diameter is obtained as the solids concentration of the resin solution is lowered.

The resin particle production method and toner production method may use an inorganic fine particle as a dispersing agent in addition to using the resin fine particle as a dispersing agent. The inorganic fine particle is exemplified by silica fine particles, alumina fine particles, titania fine particles, and composite oxide fine particles from the preceding, wherein silica fine particles are preferred.

The use is preferred of an inorganic fine particle that has been subjected to a hydrophobic treatment in order to control its hydrophobicity. This control of the hydrophobicity facilitates disposition of the inorganic fine particle at the interface between the droplet and the hydrophobic dispersion medium and thus supports improvement in the dispersion stability of the droplet.

A known hydrophobic treatment agent can be used for the hydrophobic treatment agent for the inorganic fine particle, and, for example, the use is preferred of alkoxysilanes, silazanes, straight silicone oils, and so forth. A single one of these hydrophobic treatment agents may be used by itself or two or more may be used in mixture.

There are no particular limitations on the method for carrying out the hydrophobic treatment on the inorganic fine particle and known methods may be used.

In addition, a liquid dispersion stabilizer may also be added. This dispersion stabilizer is exemplified by compounds containing an organopolysiloxane structure and/or fluorine and by the various surfactants, i.e., nonionic surfactants, anionic surfactants, and cationic surfactants, in all cases that have a high affinity for carbon dioxide. These dispersion stabilizers are discharged from the system along with the carbon dioxide in the step (b). Therefore, the amount of residue thereof in the particle is extremely low after the resin particle and toner particle production.

The particle diameter of the toner particle, as the weight-average particle diameter ($D_4$), is preferably at least 3.0 μm and not more than 8.0 μm and is more preferably at least 5.0 μm and not more than 7.0 μm. By adopting this range, the dot reproducibility can be thoroughly satisfied while good handling properties are provided.

The ratio ($D_4/D_1$) for the toner particle between the weight-average particle diameter ($D_4$) and the number-average particle diameter ($D_1$) is preferably less than 1.30.

The toner particle may as necessary contain a wax. This wax can be exemplified as follows, but this is not meant to imply a limitation thereto:

aliphatic hydrocarbon waxes such as low molecular weight polyethylene, low molecular weight polypropylene, low molecular weight olefin copolymers, microcrystalline waxes, paraffin waxes, and Fischer-Tropsch waxes; the oxides of aliphatic hydrocarbon waxes, such as oxidized polyethylene wax; waxes in which the main component is fatty acid ester, such as aliphatic hydrocarbon ester waxes; waxes provided by the partial or complete deacidification of a fatty acid ester, such as deacidified carnauba wax; partial esters between a fatty acid and a polyhydric alcohol, such as behenyl monoglyceride; and the hydroxy group-bearing methyl ester compounds yielded by the hydrogenation of plant oils.

Aliphatic hydrocarbon waxes and ester waxes are more preferred for use in the dissolution suspension method. The reasons for this are as follows: the wax dispersion is easy to produce; these waxes are readily incorporated into the resulting resin particle; and during fixing these waxes exhibit an excellent outmigration performance from the toner particle and an excellent releasability. Natural ester waxes or synthetic ester waxes may be used for the ester wax.

The synthetic ester waxes are exemplified by the monoester waxes synthesized from a long-chain linear saturated fatty acid and a long-chain linear saturated aliphatic alcohol.

A long-chain linear saturated fatty acid having general formula $C_nH_{2n+1}COOH$ wherein n is at least 5 and not more than 28 is preferably used for the long-chain linear saturated fatty acid. A long-chain linear saturated aliphatic alcohol having the general formula $C_nH_{2n+1}OH$ wherein n is at least 5 and not more than 28 is preferably used for the long-chain linear saturated aliphatic alcohol.

The natural ester waxes can be exemplified by candelilla wax, carnauba wax, rice wax, and their derivatives.

The use of a hydrocarbon wax is also a preferred embodiment.

The wax content in the toner particle, per 100.0 mass parts of the resin component in the toner particle, is preferably at least 1.0 mass part and not more than 20.0 mass parts and is more preferably at least 2.0 mass parts and not more than 15.0 mass parts.

The wax preferably has a peak temperature for the maximum endothermic peak, according to differential scanning calorimetry (DSC), of at least 60.0° C. and not more than 120.0° C. At least 60.0° C. and not more than 90.0° C. is more preferred.

The toner particle may contain a colorant. Preferred examples are carbon black and magnetic powders for black colorants and organic pigments, organic dyes, and inorganic pigments, and a known colorant can be used.

Yellow colorants are exemplified by the following: condensed azo compounds, isoindolinone compounds, anthraquinone compounds, azo metal complexes, methine compounds, and allylamide compounds. In specific terms, C. I. Pigment Yellow 12, 13, 14, 15, 17, 62, 74, 83, 93, 94, 95, 109, 110, 111, 128, 129, 147, 155, 168, and 180 are advantageously used.

Magenta colorants are exemplified by the following: condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. In specific terms, C. I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254 are advantageously used.

Cyan colorants are exemplified by the following: copper phthalocyanine compounds and their derivatives, anthraquinone compounds, and basic dye lake compounds. In specific terms, C. I. Pigment Blue 1, 7, 15, 15:1, 15:2, 15:3, 15:4, 60, 62, and 66 are advantageously used.

A single one of these colorants may be used or a mixture may be used, and these colorants may also be used in a solid solution state. The colorant used is selected considering the hue angle, chroma, lightness, lightfastness, OHP transparency, and dispersibility in the toner particle composition.

The colorant content is preferably at least 1.0 mass part and not more than 20.0 mass parts per 100.0 mass parts of the resin component. The same also applies to the use of carbon black as a black colorant.

A charge control agent may be used in the toner. The incorporation of a charge control agent makes possible a stabilization of the charging characteristics and enables control to an optimal triboelectric charge quantity in conformity with the developing system. A known charge control agent can be used as the charge control agent, and in particular a charge control agent is preferred that provides a fast charging speed and that can stably maintain a certain charge quantity.

Examples of charge control agents that control toner to negative charging are as follows. Organometal compounds and chelate compounds are effective and can be exemplified by monoazo metal compounds, acetylacetone metal compounds, and metal compounds of aromatic oxycarboxylic acids, aromatic dicarboxylic acids, oxycarboxylic acids, and dicarboxylic acids. The following are examples of charge control agents that control toner to positive charging: nigrosine, quaternary ammonium salts, metal salts of higher fatty acids, diorganotin borates, guanidine compounds, and imidazole compounds.

The content of the charge control agent, per 100.0 mass parts of the toner particle, is preferably at least 0.01 mass parts and not more than 20.0 mass parts and more preferably at least 0.5 mass parts and not more than 10.0 mass parts.

Inorganic fine particles are preferably added to the toner particle as a flowability improver. The inorganic fine particles added to the toner particle can be exemplified by fine particles such as silica fine particles, titanium oxide fine particles, alumina fine particles, and their composite oxide fine particles. Silica fine particles and titanium oxide fine particles are preferred among these inorganic fine particles.

The silica fine particles can be exemplified by dry silica or fumed silica as produced by the vapor-phase oxidation of a silicon halide, and by wet silica as produced from water glass. Here, dry silica, which has little silanol group at the surface or in the interior of the silica fine particle and which has little $Na_2O$ and $SO_3^{2-}$, is preferred. In addition, the dry silica may also be a composite fine particle of silica and another metal oxide, as produced by the use in the production process of a silicon halide compound in combination with a metal halide compound such as aluminum chloride or titanium chloride.

The use is more preferred—because this can adjust the charge quantity on the toner, can improve the environmental stability, and can achieve improved properties in high-humidity environments—of hydrophobically treated inorganic fine particles provided by subjecting the inorganic fine particles to a hydrophobic treatment.

The treatment agent used in this hydrophobic treatment of the inorganic fine particles can be exemplified by unmodified silicone varnishes, various modified silicone varnishes, unmodified silicone oils, various modified silicone oils, silane compounds, silane coupling agents, organosilicon compounds other than the preceding, and organotitanium compounds. A single one of these treatment agents may be used by itself or a combination of these treatment agents may be used.

Among the preceding, inorganic fine particles that have been treated with a silicone oil are preferred. Considered in terms of maintaining a high charge quantity on the toner particle even in high-humidity environments and reducing selective development, the hydrophobed inorganic fine particles are more preferably provided by subjecting inorganic fine particles to a hydrophobic treatment with a coupling agent and carrying out treatment with a silicone oil after or at the same time as the hydrophobic treatment with the coupling agent.

The amount of addition of the inorganic fine particle, per 100.0 mass parts of the toner particle, is preferably at least 0.1 mass parts and not more than 4.0 mass parts and more preferably at least 0.2 mass parts and not more than 3.5 mass parts.

Methods for Measuring and Evaluating the Various Properties

Method for Measuring the Number-average Molecular Weight (Mn) and the Weight-average Molecular Weight (Mw)

The molecular weights (Mn, Mw) of the resins are measured by gel permeation chromatography (GPC) as follows. First, the sample is dissolved in tetrahydrofuran (THF) over 24 hours at room temperature. The obtained solution is filtered across a "Sample Pretreatment Cartridge" solvent-resistant membrane filter (product name, Tosoh Corporation) having a pore diameter of 0.2 μm to obtain the sample solution. The sample solution is adjusted to a THF-soluble component concentration of approximately 0.8 mass %. The measurement is performed under the following conditions using this sample solution.

instrument: HLC8120 GPC (detector: RI) (product name, Tosoh Corporation)
columns: 7-column train of Shodex KF-801, 802, 803, 804, 805, 806, and 807 (product name, Showa Denko K. K.)
eluent: tetrahydrofuran (THF)
flow rate: 1.0 mL/minute
oven temperature: 40.0° C.
sample injection amount: 0.10 mL A molecular weight calibration curve constructed using, for example, the following polystyrene resin standards, is used to determine the molecular weights of the sample.

polystyrene resin standards (product name: TSK Standard Polystyrene F-850, F-450, F-288, F-128, F-80, F-40, F-20, F-10, F-4, F-2, F-1, A-5000, A-2500, A-1000, and A-500, Tosoh Corporation)

Method for Measuring the Particle Diameter of the Resin Fine Particle

The particle diameter of the resin fine particle is measured as the volume-average particle diameter (pm or nm) using a Microtrac HRA (X-100) particle size distribution analyzer (product name, Nikkiso Co., Ltd.), and the measurement is carried out at a range setting of 0.001 μm to 10 μm. Water is used as the dilution solvent.

Method for Measuring the Content in the Resin Fine Particle of Silicon Atom Originating with Units Having the Organopolysiloxane Structure of Formula (3)

The content of silicon atom originating with units having the organopolysiloxane structure of formula (3) is measured as follows using x-ray fluorescence analysis (XRF).

First, the sample is obtained by solidification of the dried resin fine particles into pellet form, and this sample is irradiated with x-rays in a helium atmosphere using an Axios Advanced wavelength-dispersive x-ray fluorescence analyzer (PANalytical B. V.) and the generated characteristic x-rays (fluorescent x-rays) are dispersed by a dispersive element.

The silicon atom content in the resin fine particle is determined by analyzing, by the fundamental parameter method (FP method), the intensities of the fluorescent x-rays dispersed at the angles corresponding to the wavelengths characteristic of each element present in the resin fine particle and obtaining the content ratio for each element present in the resin fine particle as the result of the analysis. This silicon atom content in the resin fine particle is taken to be the content in the resin fine particle of silicon atom originating with units having the organopolysiloxane structure of formula (3).

Method for Measuring the Organic Solvent-soluble Fraction and the Chloroform-Soluble Fraction in the Resins or The Resin Fine Particle The organic solvent-soluble and chloroform-soluble fractions in the resins or the resin fine particle are measured as follows. First, 0.1 g of the dried sample and 10.0 g of the organic solvent or chloroform are mixed at 25° C. to prepare a mixture and this mixture is held for 4.5 hours at 40.0° C. The component not dissolving in the organic solvent is separated by a centrifugal separation process from the organic solvent in which a component of the sample is partially dissolved. After the component that does not dissolve in the organic solvent has been dried, the mass W (g) of this component is weighed and the soluble fraction is calculated using the following formula.

soluble fraction of the sample [%]=(1−(W/0.1))×100

Method for Measuring the Weight-Average Particle Diameter ($D_4$) and the Number-Average Particle Diameter ($D_1$) of the Resin Particles and Toner Particles and Method for Evaluating the Particle Size Distribution The weight-average particle diameter ($D_4$) and the number-average particle diameter ($D_1$) of the resin particles and toner particles are determined as follows. The measurement instrument used is a "Coulter Counter Multisizer 3" (product name, Beckman Coulter, Inc.), a precision particle size distribution measurement instrument operating on the pore electrical resistance method and equipped with a 100 µm aperture tube. The measurement conditions are set and the measurement data are analyzed using the accompanying dedicated software, i.e., "Beckman Coulter Multisizer 3 Version 3.51" (product name, Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of approximately 1 mass % and, for example, "ISOTON II" (product name, Beckman Coulter, Inc.) can be used.

The dedicated software is configured as follows prior to measurement and analysis. In the "modify the standard operating method (SOM)" screen in the dedicated software, the total count number in the control mode is set to 50,000 particles; the number of measurements is set to 1 time; and the Kd value is set to the value obtained using "standard particle 10.0 µm" (Beckman Coulter, Inc.). The threshold value and noise level are automatically set by pressing the "threshold value/noise level measurement button". In addition, the current is set to 1600 µA; the gain is set to 2; the electrolyte is set to ISOTON II; and a check is entered for the "post-measurement aperture tube flush". In the "setting conversion from pulses to particle diameter" screen of the dedicated software, the bin interval is set to logarithmic particle diameter; the particle diameter bin is set to 256 particle diameter bins; and the particle diameter range is set to 2 µm to 60 µm. The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture flush" function of the dedicated software.

(2) Approximately 30 mL of the above-described aqueous electrolyte solution is introduced into a 100-mL flatbottom glass beaker. Approximately 0.3 mL of the following dilution is added to this as a dispersing agent.

dilution: the approximately three-fold (mass) dilution with deionized water of "Contaminon N" (product name, a 10 mass % aqueous solution of a neutral pH 7 detergent for cleaning precision measurement instrumentation, comprising a nonionic surfactant, anionic surfactant, and organic builder, Wako Pure Chemical Industries, Ltd.)

(3) An "Ultrasonic Dispersion System Tetora 150" (product name, Nikkaki Bios Co., Ltd.) is prepared; this is an ultrasound disperser with an electrical output of 120 W and is equipped with two oscillators (oscillation frequency=50 kHz) disposed such that the phases are displaced by 180°. Approximately 3.3 L of deionized water is introduced into the water tank of this ultrasound disperser and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the resin particles or toner particles is added to the aqueous electrolyte solution in small aliquots and dispersion is carried out. The ultrasound dispersion treatment is continued for an additional 60 seconds. The water temperature in the water tank is controlled as appropriate during ultrasound dispersion to be at least 10° C. and not more than 40° C.

(6) Using a pipette, the aqueous electrolyte solution prepared in (5) and containing dispersed resin particles or toners particles is dripped into the roundbottom beaker set in the sample stand as described in (1) with adjustment to provide a measurement concentration of approximately 5%. Measurement is then performed until the number of measured particles reaches 50,000.

(7) The measurement data is analyzed by the previously cited dedicated software provided with the instrument and the weight-average particle diameter ($D_4$) and number-average particle diameter ($D_1$) are calculated. When set to graph/volume % with the dedicated software, the "average diameter" on the "analysis/volumetric statistical value (arithmetic average)" screen is the weight-average particle diameter ($D_4$). When set to graph/number % with the dedicated software, the "average diameter" on the "analysis/ numerical statistical value (arithmetic average)" screen is the number-average particle diameter ($D_1$).

(8) The value $D_4/D_1$ obtained by dividing the $D_4$ by the $D_1$ of the analytic data in (7) is taken to be the particle size distribution.

EXAMPLES

The present invention is specifically described herebelow using examples, but the present invention is not limited to or by these examples. In the examples that follow, parts is on a mass basis unless specifically indicated otherwise.

Preparation of the Resin R and Starting Materials Containing the Partial Structures A, B, and C Used for the Resins X, Y, and Z Synthesis of Resin R1

While introducing nitrogen, the following starting materials were introduced into a heat-dried four-neck flask to prepare a monomer composition.

| | |
|---|---|
| terephthalic acid | 23.8 parts |
| isophthalic acid | 22.5 parts |
| 2 mol adduct of propylene oxide on bisphenol A | 28.7 parts |
| 2 mol adduct of ethylene oxide on bisphenol A | 13.6 parts |
| isosorbide | 10.5 parts |
| tin di (2-ethylhexanoate) | 0.52 parts |

This monomer composition was reacted for 6 hours at 200° C. under a nitrogen atmosphere. 0.99 parts of trimellitic anhydride was subsequently added at 210° C. and a reaction was run under a reduced pressure of 40 mmHg. Then, after air cooling, dissolution was performed by the addition of 150.0 parts of toluene; reprecipitation was carried out using 5-fold methanol with respect to the toluene that had been mixed; and the recovered precipitate was dried to obtain the resin R1. The molecular weight of the obtained resin R1 was Mn=10,400 and Mw=24,800.

Synthesis of Resin R2

While introducing nitrogen, the following starting materials, 150.0 parts of toluene, and 50.0 parts of N,N-dimethylformamide were mixed in a heat-dried two-neck flask to prepare a monomer composition.

| | |
|---|---|
| methacrylic acid (MAA) | 10.0 parts |
| butyl acrylate (BA) | 38.0 parts |
| styrene (St) | 52.0 parts |

This monomer composition was bubbled with nitrogen for 30 minutes while stirring at 250 rpm, after which 0.6 parts of azobismethoxydimethylvaleronitrile was admixed as polymerization initiator. This was followed by heating to 70° C. and reaction for 5 hours and subsequently heating to 80° C. and reaction for 1 hour. Then, after air cooling, reprecipitation was carried out using 5-fold methanol with respect to the toluene that had been mixed and the recovered precipitate was dried to obtain the resin R2. The molecular weight of the obtained resin R2 was Mn=23,500 and Mw=36,400.

Preparation of Macromonomer A1

A monomer composition was prepared by introducing the following starting materials into a heat-dried four-neck flask while introducing nitrogen.

| | |
|---|---|
| terephthalic acid | 7.1 parts |
| isophthalic acid | 6.8 parts |
| 2 mol adduct of propylene oxide on bisphenol A | 8.6 parts |
| 2 mol adduct of ethylene oxide on bisphenol A | 4.1 parts |
| isosorbide | 3.2 parts |
| tin di(2-ethylhexanoate) | 0.16 parts |

A reaction was run for 3 hours at 200° C. under the nitrogen atmosphere. 0.30 parts of trimellitic anhydride was then added at 210° C. and a reaction was run under a reduced pressure of 40 mmHg to obtain an amorphous polyester (APES1). This was followed by the addition of 100.0 parts of anhydrous chloroform with dissolution and the addition of 25.9 parts of triethylamine. 38.8 parts of acryloyl chloride was then gradually added dropwise on an ice bath. After the completion of the dropwise addition, stirring was carried out for 3 hours on the ice bath and stirring was then performed for an additional 12 hours. The solvent was distilled off and reprecipitation with methanol was carried out to obtain a macromonomer A1. The molecular weight of the obtained macromonomer A1 was Mn=3,200 and Mw=7,400.

Preparation of Macromonomer A2

A commercial styrene macromonomer (AS-6, Toagosei Co., Ltd.) was prepared and was used as the macromonomer A2. This macromonomer A2 has the methacryloyl group at one terminal of a polystyrene and has a molecular weight Mn=6,000.

Preparation of Macromonomer A3

The following starting materials were introduced into a heat-dried two-neck flask while introducing nitrogen.

| | |
|---|---|
| ε-caprolactone | 30.0 parts |
| stearyl alcohol | 3.3 parts |
| dibutyltin oxide | 0.20 parts |

After the nitrogen substitution of the interior of the system using a pressure-reduction process, stirring was carried out for 2 hours at 160° C. Then, while continuing to stir, the temperature was gradually raised to 230° C. under reduced pressure and holding was carried out for an additional 2 hours. Once a thick and viscous state had been assumed, the reaction was stopped by air cooling, thus synthesizing a polyester (PCL1) having the hydroxy group at one terminal. This was followed by the addition of 100.0 parts of anhydrous chloroform with dissolution and the addition of 25.9 parts of triethylamine. 38.8 parts of acryloyl chloride was then gradually added dropwise on an ice bath. After the completion of the dropwise addition, stirring was carried out for 3 hours on the ice bath and stirring was then performed for an additional 12 hours. The solvent was distilled off and reprecipitation with methanol was carried out to obtain a macromonomer A3. The molecular weight of the obtained macromonomer A3 was Mn=4,300 and Mw=8,300.

Preparation of Macromonomer A4

The following starting materials were introduced into a heat-dried two-neck flask while introducing nitrogen.

| | |
|---|---|
| 1,6-hexanediol | 11.2 parts |
| sebacic acid | 18.8 parts |
| titanium(IV) t-butoxide | 0.0011 parts |

After the nitrogen substitution of the interior of the system using a pressure-reduction process, stirring was carried out for 3 hours at 160° C. Then, while continuing to stir, the temperature was gradually raised to 180° C. under reduced pressure and holding was carried out for an additional 2 hours. The reaction was stopped by halting the heating, thus synthesizing a crystalline polyester (CPES1). This was followed by the addition of 100.0 parts of anhydrous chloroform with dissolution and the addition of 25.9 parts of triethylamine. 38.8 parts of acryloyl chloride was then gradually added dropwise on an ice bath. After the completion of the dropwise addition, stirring was carried out for 3 hours on the ice bath and stirring was then performed for an additional 12 hours. The solvent was distilled off and reprecipitation with methanol was carried out to obtain a macromonomer A4. The molecular weight of the obtained macromonomer A4 was Mn=7,800 and Mw=10,900.

Preparation of Macroinitiator A5

30.0 parts of the aforementioned PCL1 was introduced into a heat-dried two-neck flask and the interior of the flask was substituted with nitrogen. This was followed by the addition of 100.0 parts of anhydrous tetrahydrofuran with dissolution and the addition of 5.75 parts of 1-ethyl-3-(3-dimethylaminopropyl)carbodiimide hydrochloride. 8.4 parts of 4,4'-azobis(4-cyanovaleric acid) was also added, after which 0.36 parts of 4-dimethylaminopyridine was added on an ice bath. This was followed by stirring for 3 hours on the ice bath and stirring for an additional 12 hours. Removal of the solvent by distillation and reprecipitation with methanol yielded the macroinitiator A5. The molecular weight of the obtained macroinitiator A5 was Mn=6,600 and Mw=12,500.

Preparation of Macroinitiator A6

30.0 parts of the aforementioned CPES1 was introduced into a heat-dried two-neck flask and the interior of the flask was substituted with nitrogen. This was followed by the addition of 100.0 parts of anhydrous tetrahydrofuran with dissolution and the addition of 5.75 parts of 1-ethyl-3-(3-dimethylaminopropyl)carbodiimide hydrochloride. 8.4 parts of 4,4'-azobis(4-cyanovaleric acid) was also added, after which 0.36 parts of 4-dimethylaminopyridine was added on an ice bath. This was followed by stirring for 3 hours on the ice bath and stirring for an additional 12 hours. Removal of the solvent by distillation and reprecipitation with methanol yielded the macroinitiator A6. The molecular weight of the obtained macroinitiator A6 was Mn=12,100 and Mw=16,700.

Preparation of RAFT Macromonomer A7

While introducing nitrogen, the following starting materials, 150.0 parts of toluene, and 50.0 parts of N,N-dimethylformamide were mixed in a heat-dried two-neck flask to prepare a monomer composition.

| | |
|---|---|
| methacrylic acid (MAA) | 10.0 parts |
| butyl acrylate (BA) | 38.0 parts |
| styrene (St) | 52.0 parts |
| 2-cyano-2-propyl dodecyl trithiocarbonate | 2.88 parts |

This monomer composition was bubbled with nitrogen for 30 minutes while stirring at 250 rpm, after which 0.33 parts of azobisisobutyronitrile was admixed as polymerization initiator. This was followed by heating to 70° C. and reaction for 6 hours. Then, after air cooling, reprecipitation was carried out using 5-fold methanol with respect to the toluene that had been mixed and the recovered precipitate was dried to obtain the RAFT macromonomer A7. The molecular weight of the obtained RAFT macromonomer A7 was Mn=10,600 and Mw=11,700.

Preparation of Macromonomer B1

A commercial vinyl-modified organopolysiloxane (X-22-2475, Shin-Etsu Chemical Co., Ltd.) was prepared and was used as macromonomer B1. The structure of macromonomer B1 is represented by formula (5) below, wherein $R^3$, $R^4$, and $R^6$ are the methyl group, $R^5$ is the propylene group, and the value of the degree of polymerization m is 3. The molecular weight is 420.

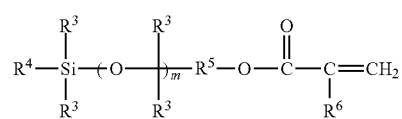

(5)

Preparation of Macromonomer B2

A commercial vinyl-modified organopolysiloxane (X-22-174DX, Shin-Etsu Chemical Co., Ltd.) was prepared and was used as macromonomer B2. The structure of macromonomer B2 is represented by formula (5) above, wherein $R^3$, $R^4$, and $R^6$ are the methyl group, $R^5$ is the propylene group, and the value of the degree of polymerization m is 60. The molecular weight is 4,600.

Preparation of Macromonomer B3

A commercial behenyl acrylate (Tokyo Chemical Industry Co., Ltd.) was prepared and was used as macromonomer B3. The molecular weight of behenyl acrylate is 380.

Preparation of Macroinitiator B4

A commercial polymeric azo polymerization initiator (VPS-1001, Wako Pure Chemical Industries, Ltd.) was prepared and was used as the macroinitiator B4. The structure of the macroinitiator B4 is represented by following formula (6) wherein the value of m is 135 and the value of n is 7 to 9. The molecular weight of the macroinitiator B4 was Mn=80,400 and Mw=181,500. (The molecular weight of the organodimethylsiloxane segment in following formula (6) is Mn=10,000.)

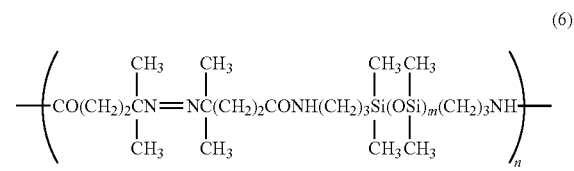

(6)

Preparation of Macromonomer C1

The following starting materials were introduced into a heat-dried two-neck flask while introducing nitrogen.

| | |
|---|---|
| ε-caprolactone | 6.0 parts |
| ω-pentadecanolactone | 25.3 parts |
| stearyl alcohol | 3.59 parts |
| dibutyltin oxide | 0.11 parts |

After the nitrogen substitution of the interior of the system using a pressure-reduction process, stirring was carried out for 2 hours at 160° C. Then, while continuing to stir, the temperature was gradually raised to 230° C. under reduced pressure and holding was carried out for an additional 2 hours. Once a thick and viscous state had been assumed, the reaction was stopped by air cooling, thus synthesizing a polyester (PCL2) having the hydroxy group at one terminal. This was followed by the addition of 100.0 parts of anhydrous chloroform with dissolution and the addition of 25.9 parts of triethylamine. 38.8 parts of acryloyl chloride was then gradually added dropwise on an ice bath. After the completion of the dropwise addition, stirring was carried out for 3 hours on the ice bath and stirring was then performed for an additional 12 hours. The solvent was distilled off and reprecipitation with methanol was carried out to obtain a macromonomer C1. The molecular weight of the obtained macromonomer C1 was Mn=4,700 and Mw=7,900, and its melting point was 75.7° C.

Preparation of Macromonomer C2

A commercial behenyl acrylate (Tokyo Chemical Industry Co., Ltd.) was prepared and was used as macromonomer C2. The molecular weight of behenyl acrylate is 380.

Preparation of Macroinitiator C3

The following starting materials were introduced into a heat-dried two-neck flask while introducing nitrogen.

| | |
|---|---|
| ε-caprolactone | 6.0 parts |
| ω-pentadecanolactone | 25.3 parts |
| stearyl alcohol | 1.3 parts |
| dibutyltin oxide | 0.11 parts |

After the nitrogen substitution of the interior of the system using a pressure-reduction process, stirring was carried out for 2 hours at 160° C. Then, while continuing to stir, the temperature was gradually raised to 230° C. under reduced pressure and holding was carried out for an additional 2 hours. Once a thick and viscous state had been assumed, the reaction was stopped by air cooling, thus synthesizing a polyester (PCL3) having the hydroxy group at one terminal. The obtained PCL3 had a molecular weight of Mn=10,700 and Mw=17,400 and had a melting point of 79.5° C. This was followed by the addition of 100.0 parts of anhydrous chloroform with dissolution and the addition of 5.75 parts of 1-ethyl-3-(3-dimethylaminopropyl)carbodiimide hydrochloride. 8.4 parts of 4,4'-azobis(4-cyanovaleric acid) was also added, after which 0.36 parts of 4-dimethylaminopyridine was added on an ice bath. This was followed by stirring for 3 hours on the ice bath and stirring for an additional 12 hours. Removal of the solvent by distillation and reprecipitation with methanol yielded the macroinitiator C3. The molecular weight of the obtained macroinitiator C3 was Mn=15,100 and Mw=26,700.

Preparation of Macroinitiator C4

The following starting materials were introduced into a heat-dried two-neck flask while introducing nitrogen.

| | |
|---|---|
| 1,12-dodecandiol | 15.0 parts |
| sebacic acid | 14.8 parts |
| titanium(IV) t-butoxide | 0.0015 parts |

After the nitrogen substitution of the interior of the system using a pressure-reduction process, stirring was carried out for 3 hours at 160° C. Then, while continuing to stir, the temperature was gradually raised to 180° C. under reduced pressure and holding was carried out for an additional 2 hours. The reaction was stopped by halting the heating, thus synthesizing a crystalline polyester (CPES2). The obtained CPES2 had a molecular weight of Mn=10,100 and Mw=16,100 and had a melting point of 81.3° C. This was followed by the addition of 100.0 parts of anhydrous chloroform with dissolution and the addition of 5.75 parts of 1-ethyl-3-(3-dimethylaminopropyl)carbodiimide hydrochloride. 8.4 parts of 4,4'-azobis(4-cyanovaleric acid) was also added, after which 0.36 parts of 4-dimethylaminopyridine was added on an ice bath. This was followed by stirring for 3 hours on the ice bath and stirring for an additional 12 hours. Removal of the solvent by distillation and reprecipitation with methanol yielded the macroinitiator C4. The molecular weight of the obtained macroinitiator C4 was Mn=15,200 and Mw=26,400.

Preparation of RAFT Macromonomer C5

While introducing nitrogen, the following starting materials and 30 parts of toluene were introduced into a heat-dried two-neck flask.

| | |
|---|---|
| behenyl acrylate | 30.0 parts |
| 2-cyano-2-propyl dodecyl trithiocarbonate | 0.96 parts |

This monomer composition was bubbled with nitrogen for 30 minutes while stirring at 250 rpm, after which 0.11 parts of azobisisobutyronitrile was admixed as polymerization initiator. This was followed by heating to 70° C. and reaction for 6 hours. Then, after air cooling, reprecipitation was carried out using 5-fold methanol with respect to the toluene that had been mixed and the recovered precipitate was dried to obtain the RAFT macromonomer C5. The molecular weight of the obtained RAFT macromonomer C5 was Mn=10,100 and Mw=10,500, and its melting point was 62.2° C.

The macromonomers and macroinitiators described above are given in tabular form in Table 1.

TABLE 1

| partial structure | starting material | composition of the partial structure | Mn of the particular starting material | acetone-soluble fraction (%) | |
|---|---|---|---|---|---|
| A | macromonomer A1 | amorphous polyester (APES1) | 3,200 | 98.1 | |
| | macromonomer A2 | polystyrene | 6,000 | 99.0 | |
| | macromonomer A3 | polycaprolactone (PCL1) | 4,300 | 98.9 | |
| | macromonomer A4 | crystalline polyester (CPES1) | 7,800 | 97.3 | |
| | macroinitiator A5 | polycaprolactone (PCL1) | 6,600 | 98.8 | |
| | macroinitiator A6 | crystalline polyester (CPES1) | 12,100 | 97.2 | |
| | RAFT macromonomer A7 | poly(styrene/butyl acrylate/methacrylic acid) | 10,600 | 98.9 | |
| B | macromonomer B1 | polysiloxane(m = 3) | 420 | 99.0 | |
| | macromonomer B2 | polysiloxane(m = 60) | 4600 | 99.0 | |
| | macromonomer B3 | behenyl group | 380 | 7.5 | ※1 |
| | macroinitiator B4 | polysiloxane(m = 135) | 80,400 | 97.0 | |
| C | macromonomer C1 | poly(caprolactone/pentadecanolactone) (PCL2) | 4,700 | 9.8 | |
| | macromonomer C2 | behenyl group | 380 | 7.5 | ※1 |
| | macroinitiator C3 | poly(caprolactone/pentadecanolactone) (PCL3) | 15,100 | 2.9 | |
| | macroinitiator C4 | crystalline polyester (CPES2) | 15,200 | 6.5 | |
| | RAFT macromonomer C5 | polybehenyl acrylate | 10,100 | 7.5 | |

※1 . . . The soluble fraction of the polybehenyl acrylate with Mn = 10,100 is given for the acetone-soluble fraction of macromonomer B3 and macromonomer C2.

Production of the Resin X and Resin X-Containing Resin Fine Particle

Synthesis of Resin X1 Graft Polymer

While introducing nitrogen, the following starting materials and 100.0 parts of toluene were introduced into a heat-dried two-neck flask.

| | |
|---|---|
| macromonomer A1 | 20.0 parts |
| macromonomer B1 | 30.0 parts |
| macromonomer C1 | 50.0 parts |
| styrene (St) | 30.0 parts |

This monomer composition was bubbled with nitrogen for 30 minutes while stirring at 250 rpm, after which 0.11 parts of azobisisobutyronitrile was admixed as polymerization initiator. This was followed by heating to 70° C. and reaction for 6 hours and subsequently heating to 80° C. and reaction for 1 hour. Then, after air cooling, reprecipitation was carried out using 5-fold methanol with respect to the toluene that had been mixed and the recovered precipitate was dried to obtain the resin X1.

Synthesis of Resin X2 Copolymer

While introducing nitrogen, the following starting materials and 100.0 parts of toluene were introduced into a heat-dried two-neck flask.

| | |
|---|---|
| macromonomer A2 | 20.0 parts |
| macroinitiator B4 | 30.0 parts |
| macromonomer C1 | 50.0 parts |
| styrene (St) | 10.0 parts |

This monomer composition was bubbled with nitrogen for 30 minutes while stirring at 250 rpm, after which heating to 70° C. and reaction for 6 hours were carried out followed by heating to 80° C. and reaction for 1 hour. Then, after air cooling, reprecipitation was carried out using 5-fold methanol with respect to the toluene that had been mixed and the recovered precipitate was dried to obtain the resin X2.

Synthesis of Resin X3 to X8 Copolymers

Resins X3 to X8 were obtained proceeding as in the synthesis of resin X2, but changing the type and composition of the macromonomer and macroinitiator to the conditions given in Table 2.

Synthesis of Resin X9 Copolymer

While introducing nitrogen, the following starting materials and 100.0 parts of toluene were introduced into a heat-dried two-neck flask.

| | |
|---|---|
| RAFT macromonomer A7 | 40.0 parts |
| macromonomer B1 | 60.0 parts |

This monomer composition was bubbled with nitrogen for 30 minutes while stirring at 250 rpm, after which 0.006 parts of azobisisobutyronitrile was admixed as polymerization initiator. This was followed by heating to 70° C. and reaction for 6 hours and subsequently heating to 80° C. and reaction for 1 hour. Then, after air cooling, reprecipitation was carried out using 5-fold methanol with respect to the toluene that had been mixed and the recovered precipitate was dried to obtain the resin X9.

Synthesis of Resin X10 Graft Polymer

Resin X10 was obtained proceeding as in the synthesis of resin X1, but changing the macromonomer type and composition to the conditions given in Table 2.

Synthesis of Resin X11 and X12 Copolymers

Resins X11 and X12 were obtained proceeding as in the synthesis of resin X9, but changing the macromonomer type and composition to the conditions given in Table 2.

TABLE 2

| | resin X | | | | | | | |
|---|---|---|---|---|---|---|---|---|
| | partial structure A | | partial structure B | | partial structure C | | | |
| | starting material type | parts | starting material type | parts | starting material type | parts | St parts |
| X1 | A1 | branch | 20.0 | B1 | branch | 30.0 | C1 | branch | 50.0 | 30.0 |
| X2 | P2 | branch | 20.0 | B4 | trunk | 30.0 | C1 | branch | 50.0 | 10.0 |
| X3 | A3 | branch | 20.0 | B2 | branch | 30.0 | C3 | trunk | 50.0 | 10.0 |
| X4 | A6 | trunk | 20.0 | B1 | branch | 30.0 | C1 | branch | 50.0 | 10.0 |
| X5 | A3 | branch | 25.0 | B2 | branch | 30.0 | C3 | trunk | 45.0 | 10.0 |
| X6 | P2 | branch | 20.0 | B2 | branch | 30.0 | C3 | trunk | 50.0 | 10.0 |
| X7 | A3 | branch | 20.0 | B2 | branch | 30.0 | C4 | trunk | 50.0 | 10.0 |
| X8 | A4 | branch | 20.0 | B1 | branch | 30.0 | C3 | trunk | 50.0 | 10.0 |
| X9 | A7 | trunk | 40.0 | B1 | branch | 60.0 | — | — | — | 0.0 |
| X10 | — | — | — | B1 | branch | 40.0 | C1 | branch | 60.0 | 10.0 |
| X11 | A7 | trunk | 35.0 | — | — | — | C1 | branch | 65.0 | 0.0 |
| X12 | A7 | trunk | 20.0 | B3 | branch | 30.0 | C1 | branch | 50.0 | 0.0 |

Production of Resin Fine Particle 1

The following starting materials were introduced into a beaker and the resin X1 was dissolved to obtain an oil phase X1.

| | |
|---|---|
| resin X1 | 30.0 parts |
| toluene | 150.0 parts |

In addition, the following starting materials were introduced into a flask to obtain an aqueous phase.

| | |
|---|---|
| deionized water | 570.0 parts |
| sodium dodecyl sulfate | 3.0 parts |

While stirring this aqueous phase, the oil phase X1 was added dropwise to the aqueous phase. Treatment for 5 minutes with an ultrasound homogenizer (UH-300, SMT Co., Ltd.) then formed submicrometer size droplets of the oil phase X1 in the aqueous phase. The toluene present in the oil phase X1 was subsequently removed using an evaporator to obtain an aqueous dispersion of a resin fine particle 1 composed of the resin X1. Ultrafiltration was performed in order to remove the excess sodium dodecyl sulfate in the aqueous dispersion, and the resin fine particle 1 was obtained by removal of the water fraction by freeze-drying.

Table 3 gives the ratio among the individual partial structures in the obtained resin fine particle 1, the particle diameter, the acetone-soluble fraction, and the chloroform-soluble fraction. The ratio among the individual partial structures was determined using $^1$H-NMR. In addition, measurement of the acetone-soluble fraction was carried out using the previously described method and using acetone, which was the organic solvent used in toner production, infra.

Production of Resin Fine Particles 2 to 7 and 9 to 13

Resin fine particles 2 to 7 and 9 to 13 were obtained proceeding as in Production of Resin Fine Particle 1, but changing the resin X1 as shown in Table 3. The properties of the resin particles obtained are shown in Table 3

Production of Resin Fine Particle 8

The following starting materials were introduced into a beaker and resin X1 was dissolved to obtain an oil phase X1'.

| | |
|---|---|
| resin X1 | 10.0 parts |
| toluene | 150.0 parts |

600.0 parts of acetone was introduced into a flask, which was then placed in an ultrasound stirrer. The oil phase X1' was filled into a disposable syringe and, using a 27G syringe needle, was added dropwise while the acetone was being stirred and irradiated with ultrasound to obtain an acetone dispersion of resin fine particle 8.

The properties of the obtained resin fine particle 8 are described in Table 3.

Production of Resin Fine Particle 14

While introducing nitrogen, the following starting materials and 800.0 parts of toluene were introduced into a heat-dried two-neck flask, and complete dissolution was carried out by heating to 70° C.

| | |
|---|---|
| macromonomer A2 | 20.0 parts |
| macromonomer B1 | 30.0 parts |
| macromonomer C1 | 50.0 parts |
| styrene | 10.0 parts |
| multifunctional monomer (dipropylene glycol diacrylate, APG-100, Shin-Nakamura Chemical Co., Ltd.) | 2.0 parts |

After bubbling with nitrogen for 30 minutes at 25° C. while stirring at 250 rpm, 0.6 parts of azobismethoxydimethylvaleronitrile was admixed as polymerization initiator. This was followed by heating to 75° C. and reaction for 6 hours and subsequently heating to 80° C. and reaction for 1 hour. Air cooling then yielded a dispersion of a particulate resin. This particulate resin dispersion was subsequently filtered; 200 parts of deionized water was added; and an aqueous dispersion of the particulate resin was obtained by ultrasound dispersion.

The resulting aqueous dispersion of the particulate resin was introduced into a temperature-controllable stirring tank and, using a pump, was processed by transfer at a flow rate of 35 g/min to a Clear SS5 (M Technique Co., Ltd.) to obtain an aqueous dispersion of resin fine particles. The processing conditions for the aqueous dispersion with the Clear SS5 were as follows: 15.7 m/s=peripheral velocity of the outermost circumference of the rotating ring-shaped disk in the Clear SS5, 1.6 μm=gap between the rotating ring-shaped disk and the fixed ring-shaped disk. In addition, the temperature of the stirring tank was adjusted so that the temperature of the liquid after processing with the Clear SS5 was not more than 40° C. The water fraction was removed from the aqueous dispersion of resin fine particles by freeze-drying to obtain the resin fine particle 14. Its properties are given in Table 3.

Production of Resin Fine Particle 15

Resin fine particle 15 was obtained proceeding as in Production of Resin Fine Particle 14, but without using the macromonomer C1. The properties are given in Table 3.

TABLE 3

| resin fine particle No. | resin | composition (number of parts) | | | | particle diameter (nm) | Si content (mass %) | acetone-soluble fraction (%) | chloroform-soluble fraction (%) |
|---|---|---|---|---|---|---|---|---|---|
| | | partial structure A | partial structure B | partial structure C | St | | | | |
| 1 | X1 | 10.2 | 20.2 | 45.0 | 24.6 | 120 | 7.6 | 19.6 | 98.6 |
| 2 | X2 | 13.4 | 33.6 | 42.8 | 10.2 | 130 | 12.7 | 21.0 | 98.3 |
| 3 | X3 | 13.3 | 22.8 | 53.3 | 10.6 | 110 | 8.6 | 26.9 | 99.1 |
| 4 | X4 | 21.1 | 27.1 | 40.9 | 10.9 | 120 | 10.3 | 25.9 | 99.0 |
| 5 | X5 | 18.1 | 23.1 | 48.7 | 10.1 | 120 | 8.7 | 26.4 | 98.6 |
| 6 | X6 | 13.1 | 22.4 | 54.0 | 10.5 | 120 | 8.5 | 26.5 | 99.9 |
| 7 | X7 | 13.4 | 22.7 | 53.7 | 10.2 | 140 | 8.6 | 24.9 | 99.3 |
| 8 | X1 | 10.2 | 20.2 | 45.0 | 24.6 | 110 | 7.6 | 19.6 | 98.6 |
| 9 | X8 | 13.6 | 22.7 | 53.4 | 10.3 | 110 | 8.6 | 24.0 | 99.5 |
| 10 | X9 | 43.6 | 56.4 | — | — | 90 | 21.3 | 98.2 | 98.9 |
| 11 | X10 | — | 32.7 | 56.4 | 10.9 | 90 | 12.4 | 17.7 | 97.6 |
| 12 | X11 | 37.4 | — | 62.6 | — | 100 | — | 21.9 | 99.6 |
| 13 | X12 | 22.1 | 28.8 | 49.1 | — | 120 | 10.9 | 16.9 | 98.0 |
| 14 | — | 17.0 | 24.3 | 48.6 | 10.1 | 130 | 9.2 | 15.4 | 14.3 |
| 15 | — | 39.2 | 50.5 | — | 10.3 | 120 | 19.1 | 18.3 | 21.9 |

Resin Particle Production and Toner Production Using Resin X-Containing Resin Fine Particles
Production of Resin Particles using Resin X-Containing Resin Fine Particles Example 1

Preparation of Resin Solution R1

141.0 parts of acetone and 100.0 parts of resin R1 were introduced into a stirrer-equipped beaker, and stirring was continued at a temperature of 40° C. until complete dissolution was achieved to prepare a resin solution R1 having a solids concentration of 41.5 mass %.

Preparation of Resin Fine Particle Dispersion 1

100.0 parts of acetone and 10.0 parts of resin fine particle 1 were introduced into a stirrer-equipped beaker, and a resin fine particle dispersion 1 having a solids concentration of 9.1 mass % was prepared by dispersion processing for 2 minutes using an ultrasound homogenizer.

Production of Resin Particle 1

| | |
|---|---|
| resin solution R1 | 241.0 parts |
| resin fine particle dispersion 1 | 110.0 parts |

These materials were introduced into a beaker and the temperature was adjusted to 40° C., after which a resin composition 1 was obtained by stirring for 1 minute at 3,000 rpm using a Disper (Tokushu Kika Kogyo Co., Ltd.).

Figure 5:
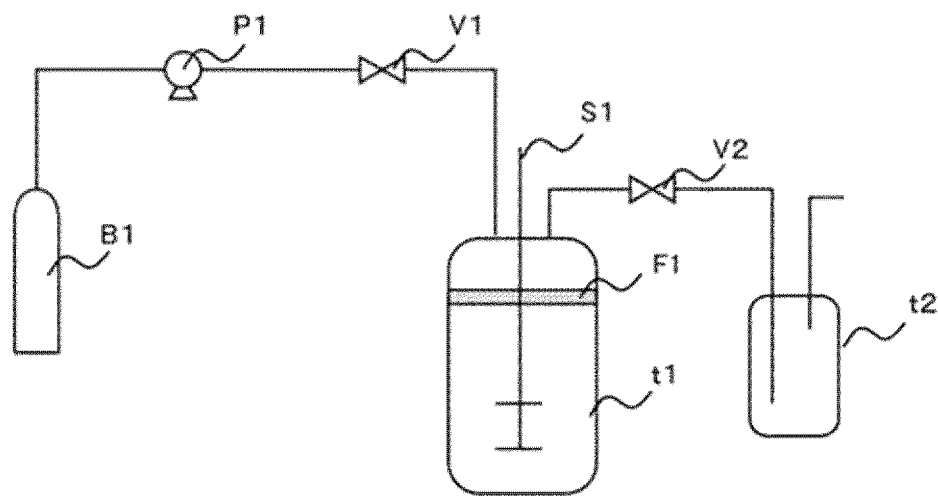
FIG. 5 is a diagram that shows an example of a toner production apparatus.

Using the apparatus shown in FIG. 5, the resin composition 1 was introduced into the granulation tank t1, whose internal temperature had been adjusted in advance to 40° C. The valve V1 and the pressure-control valve V2 were closed and the resin composition 1 was brought to 40° C. while stirring within the granulation tank t1 at a rotation rate of 300 rpm using the stirring apparatus S1. The valve V1 was then opened and carbon dioxide (purity=99.99%) was introduced into the granulation tank t1 from the cylinder B1, and the valve V1 was closed once the interior pressure had reached 2.0 MPa. The temperature in the granulation tank t1 was confirmed to be 40° C., and granulation was then performed by stirring for 10 minutes at a rotation rate of 1,000 rpm to prepare a dispersion.

The valve V1 was then opened and carbon dioxide was introduced into the granulation tank t1 from the cylinder B1 using the pump P1. During this time, the pressure-control valve V2 was set to 8.0 MPa and throughflow by the carbon dioxide was carried out while holding the internal pressure of the granulation tank t1 at 8.0 MPa. Through the execution of this process, the carbon dioxide, which contained organic solvent (mainly acetone and water) eluted from the droplets post-granulation, was discharged to the solvent recovery tank t2 and the organic solvent was separated from the carbon dioxide. After 1 hour, the pump P1 was stopped and the valve V1 was closed and the pressure-control valve V2 was opened a little at a time and the resin particle 1, which was trapped at the filter F1 by reducing the interior pressure of the granulation tank t1 to atmospheric pressure, was recovered.

Evaluation of the Resin Particles

The particle size distribution was evaluated on the resulting resin particles. The results of the evaluation are given in Table 4. The evaluation criteria are as follows.
A: The particle size distribution is less than 1.20.
B: The particle size distribution is at least 1.20 and less than 1.25.
C: The particle size distribution is at least 1.25 and less than 1.30.
D: The particle size distribution is at least 1.30 and less than 1.40.
E: The particle size distribution is at least 1.40.

Examples 2 and 3 and Comparative Examples 1, 2, and 5

Production of Resin Particles 2 to 5 and 8

Resin particles 2 to 5 and 8 were obtained proceeding as in Example 1, but changing the resin and resin fine particle used as indicated in Table 4. The evaluation results are given in Table 4.

Comparative Examples 3 and 4

Production of Resin Particles 6 and 7

Granulation was attempted proceeding as in Example 1, but changing the resin and resin fine particle used as indicated in Table 4; however, the resin composition underwent aggregation and droplets could not be formed and a dispersion could not be prepared.

Then, when extraction of the organic solvent and pressure reduction were performed as in Example 1, resin particles 6 and 7 could not be recovered and an aggregate in which the main component was resin R2 was ultimately produced.

Toner Particle Production using Resin X-Containing Resin Fine Particles

Example 4

Preparation of Colorant Dispersion

| | |
|---|---|
| C.I. Pigment Blue 15:3 | 100.0 parts |
| acetone | 150.0 parts |
| glass beads (diameter = 1 mm) | 300.0 parts |

These materials were introduced into a heat-resistant glass vessel; dispersion was carried out for 5 hours using a paint shaker (Toyo Seiki Seisaku-sho, Ltd.); and the glass beads were removed using a nylon mesh to obtain a colorant dispersion having a volume-average particle diameter of 200 nm and a solids concentration of 40.0 mass %.

Preparation of Wax Dispersion

| | |
|---|---|
| dipentaerythritol palmitate ester wax | 16.0 parts |
| wax dispersing agent | 8.0 parts |
| (copolymer having a peak molecular weight of 8,500 and provided by the graft copolymerization of 50.0 parts of styrene, 25.0 parts of n-butyl acrylate, and 10.0 parts of acrylonitrile in the presence of 15.0 parts of polyethylene) | |
| acetone | 76.0 parts |

These materials were introduced into a stirring blade-equipped glass beaker (Iwaki Glass Co., Ltd.) and the wax was dissolved in the acetone by heating the system to 50° C. The system was then gradually cooled while being gently stirred at 50 rpm, and cooling to 25° C. was carried out over 3 hours to obtain a milky white liquid. This liquid and 20.0 parts of 1-mm glass beads were introduced into a heat-resistant vessel and dispersion was carried out for 3 hours using a paint shaker. This was followed by removal of the glass beads using a nylon mesh to obtain a wax dispersion having a volume-average particle diameter of 270 nm and a solids concentration of 24.0 mass %.

Production of Toner Particle 1

| resin solution R1 | 241.0 parts |
| --- | --- |
| resin fine particle dispersion 1 | 110.0 parts |
| colorant dispersion | 12.0 parts |
| wax dispersion | 20.0 parts |

These materials were introduced into a beaker and the temperature was adjusted to 40° C., after which a toner composition 1 was obtained by stirring for 1 minute at 3,000 rpm using a Disper (Tokushu Kika Kogyo Co., Ltd.).

Using the apparatus shown in FIG. 5, the toner composition 1 was introduced into the granulation tank t1, whose internal temperature had been adjusted in advance to 40° C. The valve V1 and the pressure-control valve V2 were closed and the toner composition 1 was brought to 40° C. while stirring within the granulation tank t1 at a rotation rate of 300 rpm using the stirring apparatus S1. The valve V1 was then opened and carbon dioxide (purity=99.99%) was introduced into the granulation tank t1 from the cylinder B1, and the valve V1 was closed once the interior pressure had reached 2.0 MPa. The temperature in the granulation tank t1 was confirmed to be 40° C., and granulation was then performed by stirring for 10 minutes at a rotation rate of 1,000 rpm to prepare a dispersion.

The valve V1 was then opened and carbon dioxide was introduced into the granulation tank t1 from the cylinder B1 using the pump P1. During this time, the pressure-control valve V2 was set to 8.0 MPa and throughflow by the carbon dioxide was carried out while holding the internal pressure of the granulation tank t1 at 8.0 MPa. Through the execution of this process, the carbon dioxide, which contained organic solvent (mainly acetone and water) eluted from the droplets post-granulation, was discharged to the solvent recovery tank t2 and the organic solvent was separated from the carbon dioxide. After 1 hour, the pump P1 was stopped and the valve V1 was closed and the pressure-control valve V2 was opened a little at a time and a cyan-colored toner particle 1, which was trapped at the filter F1 by reducing the interior pressure of the granulation tank t1 to atmospheric pressure, was recovered.

Production of Toner 1

A toner 1 was obtained from toner particle 1 by adding, to 100.0 parts of the toner particle, 1.0 part of a silica fine particle having a number-average primary particle diameter of 40 nm and mixing using an FM mixer (Nippon Coke & Engineering Co., Ltd.).

Evaluation of the Toner

The particle size distribution was evaluated on the obtained toner. The evaluation results are given in Table 4. The evaluation criteria are the same as in the evaluation of the resin particles.

Evaluation of the Low-Temperature Fixability of the Toner

The resulting toner was subjected to an evaluation of its low-temperature fixability using the procedure described as follows. A color laser printer (HP Color LaserJet 3525dn, Hewlett-Packard Company) having an externalized fixing unit was prepared; the toner was removed from the cyan cartridge; and the toner to be evaluated was filled as a replacement. Then, using the filled toner, an unfixed toner image (toner laid-on level: 0.9 mg/cm$^2$) having a length of 2.0 cm and a width of 15.0 cm was formed on the image-receiving paper (HP Laser Jet90, Hewlett-Packard Company, 90 g/m$^2$) in the region 1.0 cm from the front edge considered in terms of the paper transit direction. The externalized fixing unit was then modified to enable adjustment of the fixation temperature and process speed and a fixing test on the unfixed image was carried out using this.

First, operating in a normal-temperature, normal-humidity environment (23° C., 60% RH) and with the process speed set to 250 mm/s, an unfixed image was fixed at each individual temperature while sequentially raising the set temperature stepwise in 5° C. increments from a starting temperature of 110° C. The evaluation criteria for the low-temperature fixability are given below. The low temperature-side fixing onset point is the lowest temperature at which the phenomenon of cold offset (phenomenon in which a portion of the toner ends up attached to the fixing unit) is not observed. The results of the evaluation are given in Table 4.

A: the low temperature-side fixing onset point is equal to or less than 130° C. (the low-temperature fixability is particularly excellent)

B: the low temperature-side fixing onset point is at least 135° C. and not more than 145° C. (excellent low-temperature fixability)

C: the low temperature-side fixing onset point is at least 150° C. and not more than 160° C. (good low-temperature fixability)

D: the low temperature-side fixing onset point is at least 165° C. and not more than 175° C. (somewhat poor low-temperature fixability)

E: the low temperature-side fixing onset point is equal to or greater than 180° C. (inferior low-temperature fixability)

Examples 5 to 10 and Comparative Examples 6, 7, and 10 to 12

Production of Toners 2 to 7, 9, 10, and 13 to 15

Cyan toners 2 to 7, 9, 10, and 13 to 15 were obtained proceeding as in Example 4, but changing the resin and resin fine particle used as shown in Table 4. The results of the evaluation are given in Table 4.

Example 11

Production of Toner 8

A portion of the organic solvent was removed using an evaporator from an acetone dispersion of resin fine particle 8 and the solids concentration in the acetone dispersion was measured. The resin fine particle dispersion 8 was prepared by the addition of acetone to a solids concentration of 9.1 mass %.

Using the resin fine particle dispersion 8, a cyan toner 8 was obtained proceeding as in Example 4, but changing the resin used as indicated in Table 4. The results of the evaluation are given in Table 4.

Comparative Examples 8 and 9

Production of Toners 11 and 12

Granulation was attempted proceeding as in Example 4, but changing the resin and resin fine particle used as indicated in Table 4; however, the resin composition underwent aggregation and droplets could not be formed and a dispersion could not be prepared.

Then, when extraction of the organic solvent and pressure reduction were performed as in Example 4, toner particles could not be recovered and an aggregate in which the main component was resin R2 was ultimately produced.

TABLE 4

Listing of the Results of Granulation Using Resin X

| | particle | resin fine particle No. | resin R | $SP_R$ | $SP_A$ | $SP_B$ | $|SP_R - SP_A|$ | $SP_A - SP_B$ | $D_4$ | $D_1$ | $D_4/D_1$ | $D_4/D_1$ evaluation | fixation temperature | evaluation of fixing |
|---|---|---|---|---|---|---|---|---|---|---|---|---|---|---|
| Example No. | | | | | | | | | | | | | | |
| 1 | resin particle 1 | 1 | R1 | 19.7 | 19.7 | 13.5 | 0.0 | 6.2 | 5.9 | 4.9 | 1.20 | B | — | — |
| 2 | resin particle 2 | 3 | R2 | 18.3 | 18.1 | 13.5 | 0.2 | 4.6 | 5.9 | 4.8 | 1.23 | B | — | — |
| 3 | resin particle 3 | 5 | R1 | 19.7 | 18.1 | 13.5 | 1.6 | 4.6 | 6.0 | 4.7 | 1.28 | C | — | — |
| 4 | toner 1 | 1 | R1 | 19.7 | 19.7 | 13.5 | 0.0 | 6.2 | 6.7 | 5.6 | 1.20 | B | 130 | A |
| 5 | toner 2 | 2 | R2 | 18.3 | 18.8 | 13.5 | 0.5 | 5.3 | 6.8 | 5.6 | 1.23 | B | 140 | B |
| 6 | toner 3 | 3 | R2 | 18.3 | 18.1 | 13.5 | 0.2 | 4.6 | 6.7 | 5.4 | 1.24 | B | 130 | A |
| 7 | toner 4 | 4 | R2 | 18.3 | 17.3 | 13.5 | 1.0 | 3.8 | 7.4 | 5.8 | 1.28 | C | 130 | A |
| 8 | toner 5 | 5 | R1 | 19.7 | 18.1 | 13.5 | 1.6 | 4.6 | 7.7 | 6.0 | 1.29 | C | 130 | A |
| 9 | toner 6 | 6 | R1 | 19.7 | 18.8 | 13.5 | 0.9 | 5.3 | 7.3 | 5.7 | 1.28 | C | 135 | B |
| 10 | toner 7 | 7 | R2 | 18.3 | 18.1 | 13.5 | 0.2 | 4.6 | 6.5 | 5.3 | 1.23 | B | 130 | A |
| 11 | toner 8 | 8 | R1 | 19.7 | 19.7 | 13.5 | 0.0 | 6.2 | 6.3 | 5.2 | 1.21 | B | 130 | A |
| Comparative Example No. | | | | | | | | | | | | | | |
| 1 | resin particle 4 | 9 | R1 | 19.7 | 17.3 | 13.5 | 2.4 | 3.8 | 11.2 | 7.2 | 1.56 | E | — | — |
| 2 | resin particle 5 | 10 | R2 | 18.3 | 18.3 | 13.5 | 0.0 | 4.8 | 10.7 | 7.9 | 1.36 | D | — | — |
| 3 | resin particle 6 | 11 | R2 | 18.3 | — | 13.5 | — | — | — | — | — | — | — | — |
| 4 | resin particle 7 | 12 | R2 | 18.3 | 18.3 | — | 0.0 | — | — | — | — | — | — | — |
| 5 | resin particle 8 | 13 | R1 | 19.7 | 18.3 | 16.2 | 1.4 | 2.1 | 13.5 | 8.1 | 1.67 | E | — | — |
| 6 | toner 9 | 9 | R1 | 19.7 | 17.3 | 13.5 | 2.4 | 3.8 | 11.2 | 7.2 | 1.56 | E | 145 | B |
| 7 | toner 10 | 10 | R2 | 18.3 | 18.3 | 13.5 | 0.0 | 4.8 | 10.7 | 7.9 | 1.36 | D | 145 | B |
| 8 | toner 11 | 11 | R2 | 18.3 | — | 13.5 | — | — | — | — | — | — | — | — |
| 9 | toner 12 | 12 | R2 | 18.3 | 18.3 | — | 0.0 | — | — | — | — | — | — | — |
| 10 | toner 13 | 13 | R1 | 19.7 | 18.3 | 16.2 | 1.4 | 2.1 | 13.5 | 8.1 | 1.67 | E | 145 | B |
| 11 | toner 14 | 14 | R2 | 18.3 | 18.8 | 13.5 | 0.5 | 5.3 | 6.3 | 5.1 | 1.24 | B | 170 | D |
| 12 | toner 15 | 15 | R2 | 18.3 | 18.8 | 13.5 | 0.5 | 5.3 | 7.2 | 5.8 | 1.24 | B | 175 | D |

Production of Resin Y, Resin Z, and Resin Fine Particles Containing Resin Y and Resin Z Synthesis of Resin Y1 Graft Polymer Resin Y1 was obtained proceeding as in the synthesis of the resin X1, but changing the macromonomer type and composition to the conditions given in Table 5.

Synthesis of Resin Y2, Y3, and Y8 Copolymers

Resins Y2, Y3, and Y8 were obtained proceeding as in the synthesis of the resin X2, but changing the type and composition of the macromonomer and macroinitiator to the conditions in Table 5.

Synthesis of Resin Y4 Copolymer

A monomer mixture (StAc) was produced by mixing the following starting materials in a heat-dried two-neck flask.

| methacrylic acid (MAA) | 10.0 parts |
| butyl acrylate (BA) | 38.0 parts |
| styrene (St) | 52.0 parts |

While introducing nitrogen, the following starting materials and 50.0 parts of toluene were introduced into another heat-dried two-neck flask.

| monomer mixture (StAc) | 20.0 parts |
| macroinitiator C3 | 30.0 parts |

This monomer composition was bubbled with nitrogen for 30 minutes while stirring at 250 rpm, followed by heating to 70° C. and reaction for 6 hours and subsequently heating to 80° C. and reaction for 1 hour. Then, after air cooling, reprecipitation was carried out using 5-fold methanol with respect to the toluene that had been mixed and the recovered precipitate was dried to obtain the resin Y4.

Synthesis of Resin Y5 and Y6 Copolymers

Resins Y5 and Y6 were obtained proceeding as in the synthesis of the resin Y4, but changing the monomer mixture and macromonomer composition to the conditions given in Table 5.

Synthesis of Resin Y7 Copolymer

While introducing nitrogen, the following starting materials and 100.0 parts of toluene were introduced into a heat-dried two-neck flask.

| RAFT macromonomer C5 | 60.0 parts |
| monomer mixture (StAc) | 40.0 parts |

This monomer composition was bubbled with nitrogen for 30 minutes while stirring at 250 rpm, after which 0.006 parts of azobisisobutyronitrile was admixed as polymerization initiator. This was followed by heating to 70° C. and reaction for 6 hours and subsequently heating to 80° C. and reaction for 1 hour. Then, after air cooling, reprecipitation was carried out using 5-fold methanol with respect to the toluene that had been mixed and the recovered precipitate was dried to obtain the resin Y7.

For resins Y4 to Y7, the molecular weight Mn of the partial structure A (StAc) was determined by subtracting the molecular weight Mn of the respectively used partial structure C from the molecular weight Mn of the resin Y4 to Y7. The individual molecular weights are given in Table 6.

Synthesis of Comparative Resin Y'1 Copolymer

While introducing nitrogen, the following starting materials, 150.0 parts of toluene, and 50.0 parts of N,N-dimethylformamide were mixed in a heat-dried two-neck flask to prepare a monomer composition.

| | |
|---|---|
| methacrylic acid (MAA) | 10.0 parts |
| butyl acrylate (BA) | 38.0 parts |
| styrene (St) | 52.0 parts |

This monomer composition was bubbled with nitrogen for 30 minutes while stirring at 250 rpm, after which 0.6 parts of azobismethoxydimethylvaleronitrile was admixed as polymerization initiator. This was followed by heating to 70° C. and reaction for 5 hours and subsequently heating to 80° C. and reaction for 1 hour. Then, after air cooling, reprecipitation was carried out using 5-fold methanol with respect to the toluene that had been mixed and the recovered precipitate was dried to obtain the comparative resin Y'1. The molecular weight of the obtained comparative resin Y'1 was Mn=23,500 and Mw=36,400.

Preparation of Comparative Resin Y'2

The following starting materials were introduced into a heat-dried two-neck flask while introducing nitrogen.

| | |
|---|---|
| ε-caprolactone | 6.0 parts |
| ω-pentadecanolactone | 25.3 parts |
| stearyl alcohol | 1.3 parts |
| dibutyltin oxide | 0.11 parts |

After the nitrogen substitution of the interior of the system using a pressure-reduction process, stirring was carried out for 2 hours at 160° C. Then, while continuing to stir, the temperature was gradually raised to 230° C. under reduced pressure and holding was carried out for an additional 2 hours. Once a thick and viscous state had been assumed, the reaction was stopped by air cooling, thus synthesizing the comparative resin Y'2. The molecular weight of the obtained comparative resin Y'2 was Mn=10,700 and Mw=17,400.

TABLE 5

| | resin Y | | | | | | |
|---|---|---|---|---|---|---|---|
| | partial structure A | | | partial structure C | | | |
| | starting material | type | parts | starting material | type | parts | St·X parts | config-uration |
| Y1 | A3 | branch | 25.0 | C1 | branch | 25.0 | 15.0 | IV |
| Y2 | A5 | trunk | 25.0 | C1 | branch | 25.0 | 5.0 | V |
| Y3 | A1 | branch | 25.0 | C3 | trunk | 25.0 | 5.0 | VI |
| Y4 | StAc | trunk | 30.0 | C3 | trunk | 20.0 | — | VII |

TABLE 5-continued

| | resin Y | | | | | | |
|---|---|---|---|---|---|---|---|
| | partial structure A | | | partial structure C | | | |
| | starting material | type | parts | starting material | type | parts | St·X parts | config-uration |
| Y5 | StAc | trunk | 10.0 | C3 | trunk | 40.0 | — | VII |
| Y6 | StAc | trunk | 35.0 | C3 | trunk | 15.0 | — | VII |
| Y7 | StAc | trunk | 20.0 | C5 | branch | 30.0 | — | V |
| Y8 | A4 | branch | 20.0 | C3 | trunk | 30.0 | 5.0 | VI |

X·The quantity of St for Y4 to Y7 is given included in the number of parts of the partial structure A.

TABLE 6

| | Mn of resin Y | Mn of partial structure C | Mn of the StAc segment* |
|---|---|---|---|
| Y 4 | 36,000 | 10,700 | 25,300 |
| Y 5 | 21,000 | 10,700 | 10,300 |
| Y 6 | 46,600 | 10,700 | 35,900 |
| Y 7 | 20,800 | 10,100 | 10,700 |

*The indicated value is a calculated value obtained by subtracting the molecular weight Mn of the partial structure C from the Mn of the resin Y.

Synthesis of Resin Z1 Copolymer

The resin Z1 was obtained proceeding as in the synthesis of the resin X2, but changing the type and composition of the macromonomer and macroinitiator to the conditions given in Table 7 and also changing the styrene to methyl methacrylate (MMA).

Synthesis of Resin Z2, Z4, Z5, and Z6 Copolymers

The resins Z2, Z4, Z5, and Z6 were obtained proceeding as in the synthesis of the resin X2, but changing the type and composition of the macromonomer and macroinitiator to the conditions given in Table 7.

Synthesis of Resin Z3 Graft Polymer

The resin Z3 was obtained proceeding as in the synthesis of the resin X1, but changing the macromonomer type and composition to the conditions given in Table 7.

Synthesis of Comparative Resin Z'1

While introducing nitrogen, 50.0 parts of macromonomer B1 and 50.0 parts of toluene were mixed in a heat-dried two-neck flask to prepare a monomer composition.

This monomer composition was bubbled with nitrogen for 30 minutes while stirring at 250 rpm, after which 0.3 parts of azobismethoxydimethylvaleronitrile was admixed as polymerization initiator. This was followed by heating to 70° C. and reaction for 5 hours and subsequently heating to 80° C. and reaction for 1 hour. Then, after air cooling, reprecipitation was carried out using 5-fold methanol with respect to the toluene that had been mixed and the recovered precipitate was dried to obtain the comparative resin Z'1. The molecular weight of the obtained comparative resin Z'1 was Mn=6,500 and Mw=11,400.

Preparation of Comparative Resin Z'2

The aforementioned PCL3 was used as such as the comparative resin Z'2.

TABLE 7

| | partial structure B | | | partial structure C | | | MMA parts | St parts | configuration |
|---|---|---|---|---|---|---|---|---|---|
| | starting material | type | parts | starting material | type | parts | | | |
| Z1 | B1 | branch | 25.0 | C3 | trunk | 25.0 | 5.0 | — | X |
| Z2 | B4 | trunk | 30.0 | C1 | branch | 20.0 | — | 5.0 | IX |
| Z3 | B1 | branch | 30.0 | C1 | branch | 20.0 | — | 15.0 | VIII |
| Z4 | B1 | branch | 40.0 | C3 | trunk | 10.0 | — | 5.0 | X |
| Z5 | B4 | trunk | 30.0 | C2 | branch | 20.0 | — | 5.0 | IX |
| Z6 | B3 | branch | 30.0 | C3 | trunk | 20.0 | — | 5.0 | X |

Production of Resin Fine Particle 16

The following starting materials were introduced into a sample bottle and the resin Y1 and the resin Z1 were dissolved to obtain an oil phase 1.

| resin Y1 | 15.0 parts |
|---|---|
| resin Z1 | 15.0 parts |
| toluene | 150.0 parts |

In addition, the following starting materials were introduced into a flask to obtain an aqueous phase.

| deionized water | 570.0 parts |
|---|---|
| sodium dodecyl sulfate | 3.0 parts |

While stirring this aqueous phase, the oil phase 1 was added dropwise to the aqueous phase. Treatment for 5 minutes with an ultrasound homogenizer (UH-300, SMT Co., Ltd.) then formed submicrometer size droplets of the oil phase 1 in the aqueous phase. The toluene present in the oil phase 1 was subsequently removed using an evaporator to obtain an aqueous dispersion of a resin fine particle 16 composed of the resin Y1 and the resin Z1. Ultrafiltration was performed in order to remove the excess sodium dodecyl sulfate in the aqueous dispersion, and the resin fine particle 16 was obtained by removal of the water fraction by freeze-drying. The properties are given in Table 8.

Production of Resin Fine Particles 17 to 39

Resin fine particles 17 to 39 were obtained proceeding as in Production of Resin Fine Particle 16, but changing the resin Y1 and the resin Z1 to the composition indicated in Table 8. The properties are given in Table 8.

Procedure for determining the chain length $L_A$ of the partial structure A and the chain length $L_B$ of the partial structure B present in the resin Y and the resin Z The chain length $L_A$ of the partial structure A present in the resin Y was calculated as follows.

The resin Y1 is described as an example. The resin Y1 is a graft polymer (IV in FIG. 3) from Table 5, and here the chain length $L_A$ corresponds to the length of the side chain segment from the macromonomer A3 used as the starting material for the partial structure A. The length of the side chain segment from the macromonomer A3 was thus calculated. Specifically, the number of CL units constituting PCL1 was calculated from the molecular weight (Mn=4,300) of PCL1, which corresponded to the side chain segment from the macromonomer A3, and the molecular weight (Mn=114) of the ε-caprolactone (CL) that was a constituent unit of the PCL1. The chain length of the CL unit after the ring-opening reaction (—C—C—C—C—C—C—O—) was then summed from the covalent bond radii of these atoms, and the chain length $L_A$ of PCL1 was derived from the number of CL units and the chain length of the CL unit.

In the case of the resin Y2, the macroinitiator A5 used as the starting material for the partial structure A becomes a trunk segment, and its length then corresponds to the chain length $L_A$. For the resins Y4 to Y7, partial structure A forms a trunk segment of a polymer constituted of St, BA, and MAA, and its length then corresponds to the chain length $L_A$. The length of the trunk segment in each case was therefore calculated as for the resin Y1.

With regard to the resin Y3, on the other hand, the longer of the $L_{A1}$ and $L_{A2}$ as shown in VI of FIG. 3 was considered to be the chain length $L_A$. $L_{A1}$ was determined in the same manner as described above. For $L_{A2}$, on the other hand, the determination was carried out as follows using the molecular weight Mn and the results of compositional analysis by NMR. Specifically, the number of units of CL and ω-pentadecanolactone (PDL), which constituted PCL3, were determined from the molecular weight of the partial structure C (PCL3) (Mn=10,700) and the molecular weights of the CL and PDL that were constituent units of PCL3. In addition, NMR was used to determine the ratios for the CL, PDL, APES1, and St in the resin Y3 and the number of units was determined for APES1 and St. Using $L_{A2}$ for the length of the main chain derived from these numbers of units, the chain length $L_A$ was determined by comparison with $L_{A1}$. For the resin Y3, $L_{A1}$>$L_{A2}$ and thus the $L_A$ given in Table 8 is the value of $L_{A1}$.

The chain length $L_B$ for the partial structure B present in the resin Z was also calculated using the same method as for the chain length $L_A$ as described above. The chain length $L_B$ for each resin Z is given in Table 8. For the resins Z1 and Z4, because they had the configuration of X in FIG. 4, the chain length $L_B$ was taken to be the longer of $L_{B1}$ and $L_{B2}$ using the same method as for the resin Y3 above. For the resins Z1 and Z4, $L_{B1}$<$L_{B2}$ in both instances and thus the $L_B$ given in Table 8 is the value of $L_{B2}$.

TABLE 8

| resin fine particle No. | resin | | | | composition (parts) | | | | particle diameter (nm) | Si content mass % | $L_A$ (pm) | $L_B$ (pm) | $L_A/L_B$ | acetone-soluble fraction (%) | chloroform-soluble fraction (%) |
|---|---|---|---|---|---|---|---|---|---|---|---|---|---|---|---|
| | resin Y | ratio | resin Z | ratio | partial structure A | B | C | St/MMA* | | | | | | | |
| 16 | Y1 | 50.0 | Z1 | 50.0 | 16.6 | 23.4 | 41.6 | 18.4 | 90 | 7.1 | 38886 | 18900 | 2.1 | 19.2 | 97.6 |
| 17 | Y2 | 50.0 | Z1 | 50.0 | 22.2 | 23.4 | 45.3 | 9.1 | 80 | 7.1 | 38886 | 18900 | 2.1 | 19.0 | 98.1 |
| 18 | Y3 | 50.0 | Z1 | 50.0 | 22.3 | 23.4 | 45.5 | 8.8 | 80 | 7.1 | 40234 | 18900 | 2.1 | 18.2 | 99.1 |
| 19 | Y4 | 50.0 | Z1 | 50.0 | 30.1 | 23.4 | 41.6 | 4.9 | 70 | 7.1 | 49310 | 18900 | 2.6 | 23.7 | 99.2 |
| 20 | Y1 | 50.0 | Z2 | 50.0 | 16.6 | 26.8 | 37.5 | 19.1 | 80 | 10.1 | 38886 | 48281 | 0.8 | 19.9 | 99.6 |
| 21 | Y2 | 50.0 | Z2 | 50.0 | 22.2 | 26.8 | 42.3 | 8.7 | 80 | 10.1 | 38886 | 48281 | 0.8 | 19.7 | 98.0 |
| 22 | Y3 | 50.0 | Z2 | 50.0 | 22.3 | 26.8 | 42.1 | 8.8 | 80 | 10.1 | 40234 | 48281 | 0.8 | 20.6 | 98.2 |
| 23 | Y4 | 50.0 | Z2 | 50.0 | 30.1 | 26.8 | 34.1 | 9.0 | 70 | 10.1 | 19724 | 48281 | 0.4 | 26.7 | 99.4 |
| 24 | Y1 | 50.0 | Z3 | 50.0 | 16.6 | 21.4 | 34.8 | 27.2 | 70 | 5.6 | 38886 | 2246 | 17.3 | 26.0 | 98.6 |
| 25 | Y2 | 50.0 | Z3 | 50.0 | 22.2 | 21.4 | 48.5 | 7.9 | 80 | 5.6 | 38886 | 2246 | 17.3 | 22.7 | 97.6 |
| 26 | Y3 | 50.0 | Z3 | 50.0 | 22.3 | 21.4 | 48.2 | 8.1 | 80 | 5.6 | 40234 | 2246 | 17.9 | 22.0 | 99.6 |
| 27 | Y4 | 50.0 | Z3 | 50.0 | 30.1 | 21.4 | 40.3 | 8.2 | 80 | 5.6 | 19724 | 2246 | 8.8 | 21.9 | 98.7 |
| 28 | Y4 | 30.0 | Z1 | 70.0 | 18.8 | 31.6 | 42.4 | 7.2 | 80 | 9.6 | 49310 | 18900 | 2.6 | 16.7 | 98.9 |
| 29 | Y4 | 60.0 | Z1 | 40.0 | 36.3 | 23.9 | 35.8 | 4.0 | 80 | 7.2 | 49310 | 18900 | 2.6 | 27.7 | 99.3 |
| 30 | Y5 | 50.0 | Z1 | 50.0 | 10.2 | 23.4 | 61.8 | 4.6 | 90 | 7.1 | 19724 | 18900 | 1.0 | 15.9 | 97.8 |
| 31 | Y6 | 50.0 | Z1 | 50.0 | 35.1 | 23.4 | 37.2 | 4.3 | 90 | 7.1 | 59172 | 18900 | 3.1 | 27.4 | 95.9 |
| 32 | Y1 | 40.0 | Z4 | 60.0 | 13.3 | 45.9 | 23.9 | 16.9 | 90 | 13.0 | 8481 | 13200 | 0.6 | 29.0 | 96.3 |
| 33 | Y1 | 30.0 | Z4 | 70.0 | 10.3 | 53.4 | 20.2 | 16.1 | 90 | 15.1 | 8481 | 13200 | 0.6 | 30.6 | 98.4 |
| 34 | Y7 | 50.0 | Z5 | 50.0 | 20.1 | 27.3 | 48.1 | 4.5 | 90 | 10.3 | 19724 | 48281 | 0.4 | 23.1 | 98.6 |
| 35 | Y8 | 50.0 | Z3 | 50.0 | 19.7 | 21.4 | 50.8 | 8.1 | 80 | 5.6 | 71556 | 13200 | 5.4 | 22.8 | 98.3 |
| 36 | Y'1 | 50.0 | Z'1 | 50.0 | 50.0 | 50.0 | — | — | 70 | 18.9 | 19724 | 9600 | 2.1 | 96.4 | 98.1 |
| 37 | Y'2 | 50.0 | Z3 | 50.0 | — | 21.4 | 64.8 | 13.8 | 80 | 5.6 | — | 13200 | | 18.8 | 97.4 |
| 38 | Y4 | 50.0 | Z'1 | 50.0 | 30.1 | — | 69.9 | — | 80 | — | 19724 | — | | 20.2 | 96.9 |
| 39 | Y4 | 50.0 | Z6 | 50.0 | 30.1 | 28.6 | 37.2 | 4.1 | 80 | 0.0 | 19724 | 3900 | 5.1 | 23.5 | 99.2 |

*The total amount of styrene and methyl methacrylate present in the resin Y and the resin Z is indicated.

However, the styrene that is a constituent component of the partial structure A is excluded (Y4 to Y7).

Resin Particle Production and Toner Production Using Resin Fine Particles Containing Resin Y and Resin Z Resin Particle Production Using Resin Fine Particles Containing Resin Y and Resin Z Examples 12 to 14 and Comparative Examples 13 and 17

Production of Resin Particles 9 to 12 and 16

Resin particles 9 to 12 and 16 were obtained proceeding as in Example 1, but changing the type of resin and resin fine particle used as shown in Table 9. The results of the evaluation are given in Table 9.

Comparative Examples 14 to 16

Production of Resin Particles 13 to 15

Granulation was attempted proceeding as in Example 1, but changing the type of resin and resin fine particle used as indicated in Table 9; however, the resin composition underwent aggregation and droplets could not be formed and a dispersion could not be prepared.

Then, when extraction of the organic solvent and pressure reduction were performed as in Example 1, resin particles 13 to 15 could not be recovered and an aggregate in which the main component was resin R2 was ultimately produced.

Toner Production Using Resin Fine Particles Containing Resin Y and Resin Z

Examples 15 to 33 and Comparative Examples 18 and 22

Production of Toners 16 to 35 and 39

Cyan toners 16 to 35 and 39 were obtained proceeding as in Example 4, but changing the type of resin and resin fine particle used as shown in Table 9. The results of the evaluations are given in Table 9.

Comparative Examples 19 to 21

Production of Toners 36 to 38

Granulation was attempted proceeding as in Example 4, but changing the type of resin and resin fine particle used as indicated in Table 9; however, the toner composition underwent aggregation and droplets could not be formed and a dispersion could not be prepared.

Then, when extraction of the organic solvent and pressure reduction were performed as in Example 4, toner particles could not be recovered and an aggregate in which the main component was resin R2 was ultimately produced.

TABLE 9

| | particle | resin fine particle | resin R | $SP_R$ | $SP_A$ | $SP_B$ | $|SP_R - SP_A|$ | $SP_A - SP_B$ | $D_4$ | $D_1$ | $D_4/D_1$ | $D_4/D_1$ evaluation | fixation temperature | evaluation of fixing |
|---|---|---|---|---|---|---|---|---|---|---|---|---|---|---|
| Example No. | | | | | | | | | | | | | | |
| 12 | resin particle 9 | 19 | R2 | 18.3 | 18.3 | 13.5 | 0.0 | 4.8 | 6.1 | 5.2 | 1.17 | A | — | — |

TABLE 9-continued

| | particle | resin fine particle | resin R | $SP_R$ | $SP_A$ | $SP_B$ | $|SP_R - SP_A|$ | $SP_A - SP_B$ | $D_4$ | $D_1$ | $D_4/D_1$ | $D_4/D_1$ evaluation | fixation temperature | evaluation of fixing |
|---|---|---|---|---|---|---|---|---|---|---|---|---|---|---|
| 13 | resin particle 10 | 20 | R2 | 18.3 | 18.1 | 13.5 | 0.2 | 4.6 | 6.0 | 5.0 | 1.20 | B | — | — |
| 14 | resin particle 11 | 26 | R1 | 19.7 | 19.7 | 13.5 | 0.0 | 6.2 | 6.3 | 4.9 | 1.29 | C | — | — |
| 15 | toner 16 | 16 | R2 | 18.3 | 18.1 | 13.5 | 0.2 | 4.6 | 6.6 | 5.6 | 1.18 | A | 130 | A |
| 16 | toner 17 | 17 | R2 | 18.3 | 18.1 | 13.5 | 0.2 | 4.6 | 6.9 | 5.8 | 1.19 | A | 130 | A |
| 17 | toner 18 | 18 | R1 | 19.7 | 19.7 | 13.5 | 0.0 | 6.2 | 6.2 | 5.2 | 1.19 | A | 130 | A |
| 18 | toner 19 | 19 | R2 | 18.3 | 18.3 | 13.5 | 0.0 | 4.8 | 6.7 | 5.7 | 1.18 | A | 130 | A |
| 19 | toner 20 | 20 | R2 | 18.3 | 18.1 | 13.5 | 0.2 | 4.6 | 6.5 | 5.3 | 1.23 | B | 130 | A |
| 20 | toner 21 | 21 | R2 | 18.3 | 18.1 | 13.5 | 0.2 | 4.6 | 6.9 | 5.7 | 1.22 | B | 130 | A |
| 21 | toner 22 | 22 | R1 | 19.7 | 19.7 | 13.5 | 0.0 | 6.2 | 6.6 | 5.4 | 1.22 | B | 130 | A |
| 22 | toner 23 | 23 | R2 | 18.3 | 18.3 | 13.5 | 0.0 | 4.8 | 6.9 | 5.6 | 1.23 | B | 130 | A |
| 23 | toner 24 | 24 | R2 | 18.3 | 18.1 | 13.5 | 0.2 | 4.6 | 7.1 | 5.5 | 1.29 | C | 130 | A |
| 24 | toner 25 | 25 | R2 | 18.3 | 18.1 | 13.5 | 0.2 | 4.6 | 7.0 | 5.5 | 1.27 | C | 130 | A |
| 25 | toner 26 | 26 | R1 | 19.7 | 19.7 | 13.5 | 0.0 | 6.2 | 7.2 | 5.6 | 1.29 | C | 130 | A |
| 26 | toner 27 | 27 | R2 | 18.3 | 18.3 | 13.5 | 0.0 | 4.8 | 6.9 | 5.4 | 1.28 | C | 130 | A |
| 27 | toner 28 | 28 | R2 | 18.3 | 18.3 | 13.5 | 0.0 | 4.8 | 6.9 | 5.8 | 1.19 | A | 130 | A |
| 28 | toner 29 | 29 | R2 | 18.3 | 18.3 | 13.5 | 0.0 | 4.8 | 6.2 | 5.2 | 1.19 | A | 135 | B |
| 29 | toner 30 | 30 | R2 | 18.3 | 18.3 | 13.5 | 0.0 | 4.8 | 6.7 | 5.4 | 1.24 | B | 130 | A |
| 30 | toner 3i | 31 | R2 | 18.3 | 18.3 | 13.5 | 0.0 | 4.8 | 7.0 | 5.9 | 1.19 | A | 135 | B |
| 31 | toner 32 | 32 | R2 | 18.3 | 18.1 | 13.5 | 0.2 | 4.6 | 6.8 | 5.3 | 1.28 | C | 130 | A |
| 32 | toner 33 | 33 | R2 | 18.3 | 18.1 | 13.5 | 0.2 | 4.6 | 6.5 | 5.1 | 1.27 | C | 130 | A |
| 33 | toner 34 | 34 | R2 | 18.3 | 18.3 | 13.5 | 0.0 | 4.8 | 6.9 | 5.7 | 1.21 | B | 130 | A |
| Comparative Example No. | | | | | | | | | | | | | | |
| 13 | resin particle 12 | 35 | R1 | 19.7 | 17.3 | 13.5 | 2.4 | 3.8 | 10.8 | 7.1 | 1.52 | E | — | — |
| 14 | resin particle 13 | 36 | R2 | 18.3 | 18.3 | 13.5 | 0.0 | 4.8 | — | — | — | — | — | — |
| 15 | resin particle 14 | 37 | R2 | 18.3 | — | 13.5 | — | — | — | — | — | — | — | — |
| 16 | resin particle 15 | 38 | R2 | 18.3 | 18.3 | — | 0.0 | — | — | — | — | — | — | — |
| 17 | resin particle 16 | 39 | R1 | 19.7 | 18.3 | 16.2 | 1.4 | 2.1 | 12.8 | 7.9 | 1.62 | E | — | — |
| 18 | toner 35 | 35 | R1 | 19.7 | 17.3 | 13.5 | 2.4 | 3.8 | 11.8 | 7.1 | 1.66 | E | 145 | B |
| 19 | toner 36 | 36 | R2 | 18.3 | 18.3 | 13.5 | 0.0 | 4.8 | — | — | — | — | — | — |
| 20 | toner 37 | 37 | R2 | 18.3 | — | 13.5 | — | — | — | — | — | — | — | — |
| 21 | toner 38 | 38 | R2 | 18.3 | 18.3 | — | 0.0 | — | — | — | — | — | — | — |
| 22 | toner 39 | 39 | R1 | 19.7 | 18.3 | 16.2 | 1.4 | 2.1 | 13.5 | 8.1 | 1.67 | E | 145 | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-24431, filed Feb. 13, 2017, and Japanese Patent Application No. 2017-247821, filed Dec. 25, 2017, which are hereby incorporated by reference herein in their entirety.

What is claimed is:

1. A method of producing a toner comprising a toner particle, the method comprising the steps of:
    a) mixing a resin fine particle, an organic solvent, and a resin R with a dispersion medium comprising carbon dioxide, to prepare a dispersion, in which a droplet comprising the resin R is dispersed in the dispersion medium, and
    a surface of the droplet being covered with the resin fine particle; and
    b) removing the organic solvent contained in the droplet and dispersion medium by flowing carbon dioxide under pressurization through the dispersion, wherein
    the resin fine particle contains one or more resins that have a partial structure A, a partial structure B, and a partial structure C,
    the resin fine particle is soluble in chloroform,
    a resin A constituted of only the partial structure A and a resin B constituted of only the partial structure B are soluble in the organic solvent,
    a resin C constituted of only the partial structure C is insoluble in the organic solvent, and
    the resin fine particle satisfies following formulas (1) and (2):

$$|SP_R - SP_A| \leq 2.0 \qquad \text{formula (1)}$$

$$3.0 \leq (SP_A - SP_B) \qquad \text{formula (2)}$$

where, $SP_A$ represents an SP value of the partial structure A, $SP_R$ represents an SP value of the resin R, and $SP_B$ represents an SP value of the partial structure B.

2. The method of producing a toner according to claim 1, wherein the content of the partial structure A in the resin fine particle is at least 10.0 mass % and not more than 40.0 mass % with respect to the total resin constituting the resin fine particle.

3. The method of producing a toner according to claim 1, wherein the chain length $L_B$ of the partial structure B is at least 18,000 pm and not more than 120,000 pm, and the ratio ($L_A/L_B$) between the chain length $L_A$ of the partial structure A and the chain length $L_B$ is at least 1.6 and not more than 4.5.

4. The method of producing a toner according to claim 1, wherein the partial structure B has an organopolysiloxane structure represented by following formula (3),

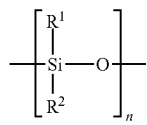

(3)

where, $R^1$ and $R^2$ each independently represent an alkyl group having 1 to 3 carbons and n is an integer that is 2 to 150.

5. The method of producing a toner according to claim 4, wherein $R^1$ and $R^2$ are a methyl group in the formula (3), the resin fine particle contains at least 5.0 mass % and not more than 30.0 mass % of silicon (Si) atom originating with the organopolysiloxane structure.

6. The method of producing a toner according to claim 1, wherein the partial structure C comprises a crystalline resin.

7. The method of producing a toner according to claim 6, wherein the melting point of the crystalline resin is at least 70° C.

8. The method of producing a toner according to claim 6, wherein the crystalline resin comprises a crystalline polyester.

9. The method of producing a toner according to claim 1, wherein the fraction of the resin fine particle soluble in the organic solvent is not more than 35.0 mass %.

10. The method of producing a toner according to claim 1, wherein the organic solvent is at least one selected from the group consisting of acetone, ethyl acetate, methyl ethyl ketone, tetrahydrofuran, and 2-phenylethyl alcohol.

11. The method of producing a toner according to claim 1, wherein the resin fine particle comprises a resin X having the partial structure A, the partial structure B, and the partial structure C.

12. The method of producing a toner according to claim 11, wherein the resin X is a graft polymer having each of the partial structure A, the partial structure B, and the partial structure C as branch segments.

13. The method of producing a toner according to claim 11, wherein the resin X is any of following copolymers (I) to (III):
   (I) a copolymer in which a segment having the partial structure A as a trunk segment is bonded to a segment comprising a graft polymer in which the partial structure B and the partial structure C are branch segments;
   (II) a copolymer in which a segment having the partial structure B as a trunk segment is bonded to a segment comprising a graft polymer in which the partial structure A and the partial structure C are branch segments; and
   (III) a copolymer in which a segment having the partial structure C as a trunk segment is bonded to a segment comprising a graft polymer in which the partial structure A and the partial structure B are branch segments.

14. The method of producing a toner according to claim 1, wherein the resin fine particle comprises a resin Y having the partial structure A and the partial structure C and a resin Z having the partial structure B and the partial structure C.

15. The method of producing a toner according to claim 14, wherein the resin Y is at least one polymer selected from following (IV) to (VII):
   (IV) a graft polymer having the partial structure A and the partial structure C as branch segments;
   (V) a copolymer in which a segment having the partial structure A as a trunk segment is bonded to a segment comprising a graft polymer having the partial structure C as a branch segment;
   (VI) a copolymer in which a segment having the partial structure C as a trunk segment is bonded to a segment comprising a graft polymer having the partial structure A as a branch segment; and
   (VII) a copolymer in which a segment having the partial structure A as a trunk segment is bonded to a segment having the partial structure C as a trunk segment, and
   the resin Z is at least one polymer selected from following (VIII) to (XI):
   (VIII) a graft polymer having the partial structure B and the partial structure C as branch segments;
   (IX) a copolymer in which a segment having the partial structure B as a trunk segment is bonded to a segment comprising a graft polymer having the partial structure C as a branch segment;
   (X) a copolymer in which a segment having the partial structure C as a trunk segment is bonded to a segment comprising a graft polymer having the partial structure B as a branch segment; and
   (XI) a copolymer in which a segment having the partial structure B as a trunk segment is bonded to a segment having the partial structure C as a trunk segment.

16. A method of producing a resin particle, the method comprising the step of:
   mixing a resin fine particle, an organic solvent, and a resin R with a dispersion medium comprising carbon dioxide, to prepare a dispersion, in which a droplet comprising the resin R is dispersed in the dispersion medium, and
   a surface of the droplet being covered with the resin fine particle;
wherein
   the resin fine particle contains one or more resins that have a partial structure A, a partial structure B, and a partial structure C,
   the resin fine particle is soluble in chloroform,
   a resin A constituted of only the partial structure A and a resin B constituted of only the partial structure B are soluble in the organic solvent,
   a resin C constituted of only the partial structure C is insoluble in the organic solvent, and
   the resin fine particle satisfies following formulas (1) and (2):

$$|SP_R - SP_A| \leq 2.0 \quad \text{formula (1)}$$

$$3.0 \leq (SP_A - SP_B) \quad \text{formula (2)}$$

where, $SP_A$ represents an SP value of the partial structure A, $SP_B$ represents an SP value of the partial structure B, and $SP_R$ represents an SP value of the resin R.

17. A resin fine particle comprising a resin X having a partial structure A, a partial structure B, and a partial structure C, or
   a resin fine particle comprising a resin Y having a partial structure A and a partial structure C and a resin Z having a partial structure B and a partial structure C, wherein following formula (2) is satisfied $$3.0 \le (SP_A - SP_B) \quad \text{formula (2)}$$

where $SP_A$ is an SP value of the partial structure A and $SP_B$ is an SP value of the partial structure B,
    a resin A constituted of only the partial structure A and a resin B constituted of only the partial structure B are soluble in an organic solvent,
    a resin C constituted of only the partial structure C is insoluble in the organic solvent, and
    the organic solvent is at least one selected from the group consisting of acetone, ethyl acetate, methyl ethyl ketone, tetrahydrofuran, and 2-phenylethyl alcohol.

* * * * *